(12) United States Patent
Hirata

(10) Patent No.: US 8,294,736 B2
(45) Date of Patent: Oct. 23, 2012

(54) DISPLAY DEVICE DRIVING METHOD, DRIVING CIRCUIT, LIQUID CRYSTAL DISPLAY DEVICE, AND TELEVISION RECEIVER

(75) Inventor: Mitsuaki Hirata, Taki-gun Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 640 days.

(21) Appl. No.: 12/311,499

(22) PCT Filed: Aug. 21, 2007

(86) PCT No.: PCT/JP2007/066175
§ 371 (c)(1),
(2), (4) Date: Apr. 1, 2009

(87) PCT Pub. No.: WO2008/062591
PCT Pub. Date: May 29, 2008

(65) Prior Publication Data
US 2010/0002018 A1    Jan. 7, 2010

(30) Foreign Application Priority Data

Nov. 20, 2006    (JP) .................. 2006-313582

(51) Int. Cl.
G09G 5/10    (2006.01)
G09G 3/36    (2006.01)
H04N 5/50    (2006.01)
H04N 3/14    (2006.01)
(52) U.S. Cl. ........... 345/690; 348/731; 348/790; 345/89
(58) Field of Classification Search .................. 345/690
See application file for complete search history.

(56) References Cited

U.S. PATENT DOCUMENTS

| | | | |
|---|---|---|---|
| 5,070,326 | A | 12/1991 | Yoshimoto et al. |
| 5,216,414 | A | 6/1993 | Fukutani et al. |
| 5,250,932 | A | 10/1993 | Yoshimoto et al. |
| 5,303,073 | A | 4/1994 | Shirota et al. |
| 5,604,511 | A | 2/1997 | Ohi |
| 6,236,392 | B1 * | 5/2001 | Inamori .................. 345/204 |

(Continued)

FOREIGN PATENT DOCUMENTS

JP    63-025629    2/1988

(Continued)

OTHER PUBLICATIONS

"Kankaku-juyo (Reception; Sensation)", search date: Sep. 15, 2006; URL< http:www.tmd.ac.jp/med/phy1/ptext/receptor.html>.

(Continued)

*Primary Examiner* — Amare Mengistu
*Assistant Examiner* — Mihir Rayan
(74) *Attorney, Agent, or Firm* — Harness, Dickey & Pierce, P.L.C.

(57) ABSTRACT

In one embodiment of the present invention, a method for driving a display device that outputs an image based on an image source is disclosed. The method includes the steps of (i) carrying out a first gradation converting process with respect to a first gradation level of an inputted video source signal; (ii) carrying out a smoothing process with respect to the inputted video source signal that has been subjected to the first gradation converting process; and (iii) carrying out a second gradation converting process with respect to a second gradation level of the inputted video source signal that has been subjected to the smoothing process.

6 Claims, 29 Drawing Sheets

U.S. PATENT DOCUMENTS

| | | | |
|---|---|---|---|
| 6,512,564 B1 | 1/2003 | Yoshida et al. | |
| 6,661,488 B1 | 12/2003 | Takeda et al. | |
| 6,724,452 B1 | 4/2004 | Takeda et al. | |
| 6,906,762 B1 | 6/2005 | Witehira et al. | |
| 7,167,224 B1 | 1/2007 | Takeda et al. | |
| 7,224,421 B1 | 5/2007 | Takeda et al. | |
| 7,253,861 B2 | 8/2007 | Niiyama et al. | |
| 7,304,703 B1 | 12/2007 | Takeda et al. | |
| 2001/0043295 A1* | 11/2001 | Chen et al. | 349/74 |
| 2001/0046008 A1 | 11/2001 | Ueda et al. | |
| 2002/0030651 A1* | 3/2002 | Yamamoto | 345/87 |
| 2003/0086044 A1* | 5/2003 | Inoue et al. | 349/141 |
| 2003/0128299 A1* | 7/2003 | Coleman et al. | 348/674 |
| 2003/0198401 A1 | 10/2003 | Shimazaki et al. | |
| 2004/0066388 A1* | 4/2004 | Leather et al. | 345/611 |
| 2004/0119924 A1 | 6/2004 | Takeda et al. | |
| 2004/0183972 A1* | 9/2004 | Bell | 349/117 |
| 2004/0239866 A1 | 12/2004 | Sasabayashi et al. | |
| 2005/0226526 A1* | 10/2005 | Mitsunaga | 382/274 |
| 2006/0066788 A1 | 3/2006 | Utsumi et al. | |
| 2006/0125745 A1* | 6/2006 | Evanicky | 345/84 |
| 2006/0176260 A1* | 8/2006 | Koyama | 345/89 |
| 2006/0290594 A1 | 12/2006 | Engel et al. | |
| 2007/0063925 A1 | 3/2007 | Yoshihara et al. | |
| 2007/0064187 A1 | 3/2007 | Takeda et al. | |
| 2008/0079755 A1 | 4/2008 | Shiomi | |
| 2008/0165314 A1 | 7/2008 | Takeda et al. | |
| 2008/0303995 A1 | 12/2008 | Shimodaira et al. | |
| 2008/0303997 A1 | 12/2008 | Takeda et al. | |
| 2009/0046212 A1 | 2/2009 | Tsubata et al. | |
| 2009/0051707 A1 | 2/2009 | Hirata et al. | |
| 2009/0109351 A1 | 4/2009 | Shiomi | |
| 2009/0147186 A1 | 6/2009 | Nakai et al. | |

FOREIGN PATENT DOCUMENTS

| | | |
|---|---|---|
| JP | 64-049021 | 2/1989 |
| JP | 01-277215 | 11/1989 |
| JP | 01-309024 | 12/1989 |
| JP | 02-000023 | 1/1990 |
| JP | 04-97134 | 3/1992 |
| JP | 05-088197 | 4/1993 |
| JP | 05-257124 | 10/1993 |
| JP | 06-043516 | 2/1994 |
| JP | 06-110076 | 4/1994 |
| JP | 06-289833 | 10/1994 |
| JP | 06-306266 | 11/1994 |
| JP | 11-167106 | 6/1999 |
| JP | 2001-188120 | 7/2001 |
| JP | 2002-504764 | 2/2002 |
| JP | 2002-090536 | 3/2002 |
| JP | 2002-528743 | 9/2002 |
| JP | 2003-020255 | 1/2003 |
| JP | 2003-040649 | 2/2003 |
| JP | 2003-149730 | 5/2003 |
| JP | 2003-195343 | 7/2003 |
| JP | 2004-301878 | 10/2004 |
| JP | 2004-309553 | 11/2004 |
| JP | 2005-031552 | 2/2005 |
| JP | 2005-208522 | 8/2005 |
| JP | 2005-533275 | 11/2005 |
| WO | WO 2006/068224 | 6/2006 |

OTHER PUBLICATIONS

"Kankaku no Sokutei (Measurement of Sensation)", search date: Sep. 15, 2006; URL <http://www.oak.dti.ne.jp/~xkana/pyscho/intro/intro_03/>.

"Shinri-butsurigaku towananika (What is psychophysics)", search date: Sep. 15, 2006; URL <http://uchikawa-www.ip.titech.ac.jp/~masuda/J/principia/whatsVPP/whatsVPP.html>.

U.S. Notice of Allowance dated Oct. 21, 2009 for U.S. Appl. No. 11/990,072.

U.S. Office Action dated Apr. 5, 2011 for U.S. Appl. No. 11/991,917.

U.S. Restriction Requirement dated Jul. 12, 2011 for U.S. Appl. No. 12/449,992.

U.S. Office Action dated May 30, 2012 for U.S. Appl. No. 11/992,579.

* cited by examiner

| $X_1$ | $X_2$ | $X_1$ | $X_2$ | $X_1$ | $X_2$ | $X_1$ | $X_2$ | $X_1$ | $X_2$ | $X_1$ | $X_2$ | $X_1$ | $X_2$ | $X_1$ | $X_2$ |
|---|---|---|---|---|---|---|---|---|---|---|---|---|---|---|---|
| 0 | 0 | 32 | 243 | 64 | 255 | 96 | 255 | 128 | 255 | 160 | 255 | 192 | 255 | 224 | 255 |
| 1 | 74 | 33 | 244 | 65 | 255 | 97 | 255 | 129 | 255 | 161 | 255 | 193 | 255 | 225 | 255 |
| 2 | 115 | 34 | 245 | 66 | 255 | 98 | 255 | 130 | 255 | 162 | 255 | 194 | 255 | 226 | 255 |
| 3 | 137 | 35 | 246 | 67 | 255 | 99 | 255 | 131 | 255 | 163 | 255 | 195 | 255 | 227 | 255 |
| 4 | 153 | 36 | 246 | 68 | 255 | 100 | 255 | 132 | 255 | 164 | 255 | 196 | 255 | 228 | 255 |
| 5 | 165 | 37 | 247 | 69 | 255 | 101 | 255 | 133 | 255 | 165 | 255 | 197 | 255 | 229 | 255 |
| 6 | 174 | 38 | 248 | 70 | 255 | 102 | 255 | 134 | 255 | 166 | 255 | 198 | 255 | 230 | 255 |
| 7 | 182 | 39 | 248 | 71 | 255 | 103 | 255 | 135 | 255 | 167 | 255 | 199 | 255 | 231 | 255 |
| 8 | 188 | 40 | 249 | 72 | 255 | 104 | 255 | 136 | 255 | 168 | 255 | 200 | 255 | 232 | 255 |
| 9 | 194 | 41 | 249 | 73 | 255 | 105 | 255 | 137 | 255 | 169 | 255 | 201 | 255 | 233 | 255 |
| 10 | 199 | 42 | 250 | 74 | 255 | 106 | 255 | 138 | 255 | 170 | 255 | 202 | 255 | 234 | 255 |
| 11 | 203 | 43 | 250 | 75 | 255 | 107 | 255 | 139 | 255 | 171 | 255 | 203 | 255 | 235 | 255 |
| 12 | 207 | 44 | 251 | 76 | 255 | 108 | 255 | 140 | 255 | 172 | 255 | 204 | 255 | 236 | 255 |
| 13 | 211 | 45 | 251 | 77 | 255 | 109 | 255 | 141 | 255 | 173 | 255 | 205 | 255 | 237 | 255 |
| 14 | 214 | 46 | 251 | 78 | 255 | 110 | 255 | 142 | 255 | 174 | 255 | 206 | 255 | 238 | 255 |
| 15 | 217 | 47 | 252 | 79 | 255 | 111 | 255 | 143 | 255 | 175 | 255 | 207 | 255 | 239 | 255 |
| 16 | 219 | 48 | 252 | 80 | 255 | 112 | 255 | 144 | 255 | 176 | 255 | 208 | 255 | 240 | 255 |
| 17 | 222 | 49 | 252 | 81 | 255 | 113 | 255 | 145 | 255 | 177 | 255 | 209 | 255 | 241 | 255 |
| 18 | 224 | 50 | 253 | 82 | 255 | 114 | 255 | 146 | 255 | 178 | 255 | 210 | 255 | 242 | 255 |
| 19 | 226 | 51 | 253 | 83 | 255 | 115 | 255 | 147 | 255 | 179 | 255 | 211 | 255 | 243 | 255 |
| 20 | 228 | 52 | 253 | 84 | 255 | 116 | 255 | 148 | 255 | 180 | 255 | 212 | 255 | 244 | 255 |
| 21 | 230 | 53 | 253 | 85 | 255 | 117 | 255 | 149 | 255 | 181 | 255 | 213 | 255 | 245 | 255 |
| 22 | 231 | 54 | 254 | 86 | 255 | 118 | 255 | 150 | 255 | 182 | 255 | 214 | 255 | 246 | 255 |
| 23 | 233 | 55 | 254 | 87 | 255 | 119 | 255 | 151 | 255 | 183 | 255 | 215 | 255 | 247 | 255 |
| 24 | 234 | 56 | 254 | 88 | 255 | 120 | 255 | 152 | 255 | 184 | 255 | 216 | 255 | 248 | 255 |
| 25 | 236 | 57 | 254 | 89 | 255 | 121 | 255 | 153 | 255 | 185 | 255 | 217 | 255 | 249 | 255 |
| 26 | 237 | 58 | 254 | 90 | 255 | 122 | 255 | 154 | 255 | 186 | 255 | 218 | 255 | 250 | 255 |
| 27 | 238 | 59 | 254 | 91 | 255 | 123 | 255 | 155 | 255 | 187 | 255 | 219 | 255 | 251 | 255 |
| 28 | 239 | 60 | 254 | 92 | 255 | 124 | 255 | 156 | 255 | 188 | 255 | 220 | 255 | 252 | 255 |
| 29 | 240 | 61 | 254 | 93 | 255 | 125 | 255 | 157 | 255 | 189 | 255 | 221 | 255 | 253 | 255 |
| 30 | 241 | 62 | 254 | 94 | 255 | 126 | 255 | 158 | 255 | 190 | 255 | 222 | 255 | 254 | 255 |
| 31 | 242 | 63 | 254 | 95 | 255 | 127 | 255 | 159 | 255 | 191 | 255 | 223 | 255 | 255 | 255 |

| $X_1$ | $X_2$ | $X_1$ | $X_2$ | $X_1$ | $X_2$ | $X_1$ | $X_2$ | $X_1$ | $X_2$ | $X_1$ | $X_2$ | $X_1$ | $X_2$ | $X_1$ | $X_2$ |
|---|---|---|---|---|---|---|---|---|---|---|---|---|---|---|---|
| 0 | 0 | 32 | 93 | 64 | 147 | 96 | 178 | 128 | 201 | 160 | 218 | 192 | 232 | 224 | 244 |
| 1 | 0 | 33 | 95 | 65 | 148 | 97 | 179 | 129 | 201 | 161 | 219 | 193 | 233 | 225 | 245 |
| 2 | 0 | 34 | 97 | 66 | 149 | 98 | 180 | 130 | 202 | 162 | 219 | 194 | 233 | 226 | 245 |
| 3 | 0 | 35 | 100 | 67 | 150 | 99 | 181 | 131 | 203 | 163 | 220 | 195 | 234 | 227 | 245 |
| 4 | 0 | 36 | 102 | 68 | 151 | 100 | 181 | 132 | 203 | 164 | 220 | 196 | 234 | 228 | 246 |
| 5 | 0 | 37 | 104 | 69 | 152 | 101 | 182 | 133 | 204 | 165 | 221 | 197 | 234 | 229 | 246 |
| 6 | 0 | 38 | 106 | 70 | 154 | 102 | 183 | 134 | 204 | 166 | 221 | 198 | 235 | 230 | 246 |
| 7 | 0 | 39 | 108 | 71 | 155 | 103 | 184 | 135 | 205 | 167 | 221 | 199 | 235 | 231 | 247 |
| 8 | 0 | 40 | 110 | 72 | 156 | 104 | 185 | 136 | 205 | 168 | 222 | 200 | 236 | 232 | 247 |
| 9 | 0 | 41 | 112 | 73 | 157 | 105 | 185 | 137 | 206 | 169 | 222 | 201 | 236 | 233 | 247 |
| 10 | 2 | 42 | 114 | 74 | 158 | 106 | 186 | 138 | 206 | 170 | 223 | 202 | 236 | 234 | 248 |
| 11 | 9 | 43 | 116 | 75 | 159 | 107 | 187 | 139 | 207 | 171 | 223 | 203 | 237 | 235 | 248 |
| 12 | 16 | 44 | 117 | 76 | 160 | 108 | 187 | 140 | 208 | 172 | 224 | 204 | 237 | 236 | 248 |
| 13 | 22 | 45 | 119 | 77 | 161 | 109 | 188 | 141 | 208 | 173 | 224 | 205 | 237 | 237 | 249 |
| 14 | 28 | 46 | 121 | 78 | 162 | 110 | 189 | 142 | 209 | 174 | 225 | 206 | 238 | 238 | 249 |
| 15 | 33 | 47 | 123 | 79 | 163 | 111 | 190 | 143 | 209 | 175 | 225 | 207 | 238 | 239 | 249 |
| 16 | 38 | 48 | 124 | 80 | 164 | 112 | 190 | 144 | 210 | 176 | 226 | 208 | 239 | 240 | 250 |
| 17 | 43 | 49 | 126 | 81 | 165 | 113 | 191 | 145 | 210 | 177 | 226 | 209 | 239 | 241 | 250 |
| 18 | 48 | 50 | 127 | 82 | 166 | 114 | 192 | 146 | 211 | 178 | 227 | 210 | 239 | 242 | 250 |
| 19 | 52 | 51 | 129 | 83 | 167 | 115 | 192 | 147 | 212 | 179 | 227 | 211 | 240 | 243 | 251 |
| 20 | 56 | 52 | 130 | 84 | 168 | 116 | 193 | 148 | 212 | 180 | 228 | 212 | 240 | 244 | 251 |
| 21 | 60 | 53 | 132 | 85 | 169 | 117 | 194 | 149 | 213 | 181 | 228 | 213 | 240 | 245 | 251 |
| 22 | 63 | 54 | 133 | 86 | 170 | 118 | 194 | 150 | 213 | 182 | 228 | 214 | 241 | 246 | 252 |
| 23 | 67 | 55 | 135 | 87 | 171 | 119 | 195 | 151 | 214 | 183 | 229 | 215 | 241 | 247 | 252 |
| 24 | 70 | 56 | 136 | 88 | 171 | 120 | 196 | 152 | 214 | 184 | 229 | 216 | 242 | 248 | 252 |
| 25 | 73 | 57 | 138 | 89 | 172 | 121 | 196 | 153 | 215 | 185 | 229 | 217 | 242 | 249 | 253 |
| 26 | 76 | 58 | 139 | 90 | 173 | 122 | 197 | 154 | 215 | 186 | 230 | 218 | 242 | 250 | 253 |
| 27 | 79 | 59 | 140 | 91 | 174 | 123 | 198 | 155 | 216 | 187 | 230 | 219 | 243 | 251 | 253 |
| 28 | 82 | 60 | 142 | 92 | 175 | 124 | 198 | 156 | 216 | 188 | 231 | 220 | 243 | 252 | 254 |
| 29 | 85 | 61 | 143 | 93 | 176 | 125 | 199 | 157 | 217 | 189 | 231 | 221 | 243 | 253 | 254 |
| 30 | 57 | 62 | 144 | 94 | 177 | 126 | 199 | 158 | 217 | 190 | 232 | 222 | 244 | 254 | 254 |
| 31 | 90 | 63 | 145 | 95 | 177 | 127 | 200 | 159 | 218 | 191 | 232 | 223 | 244 | 255 | 255 |

DISPLAY DEVICE DRIVING METHOD, DRIVING CIRCUIT, LIQUID CRYSTAL DISPLAY DEVICE, AND TELEVISION RECEIVER

TECHNICAL FIELD

The present invention relates to a display device and a television receiver including the display device, each of which improves a display quality.

BACKGROUND ART

In order to improve a display quality of a liquid crystal display device, it is necessary to improve contrast.

There have been various techniques to improve the contrast of a liquid crystal display device. The following Patent Literatures 1 through 7 disclose such techniques.

Patent Literature 1 discloses a technique for improving a contrast ratio by optimizing content and a surface area ratio of a yellow pigment in pigment components of a color filter. This can successfully resolve a problem that a contrast ratio of a liquid crystal display device is reduced due to pigment molecules in the color filter which scatter and depolarize polarized light. According to Patent Literature 1, the technique improves the contrast ratio of a liquid crystal display device from 280 to 420.

Further, Patent Literature 2 discloses a technique for improving a contrast ratio by increasing a transmittance and a polarization degree of a polarizer. According to Patent Literature 2, the technique improves the contrast ratio of a liquid crystal display device from 200 to 250.

Moreover, Patent Literatures 3 and 4 disclose techniques for improving a contrast in a guest-host mode that makes use of light absorbability of a dichroic dye.

Patent Literature 3 discloses a method in which a contrast is improved by a structure in which a quarter-wavelength plate is sandwiched between two layers of guest-host liquid crystal cells. Patent Literature 3 discloses that no polarizer is used.

Further, Patent Literature 4 discloses a liquid crystal display element in which a dichroic dye is mixed in a liquid crystal for use in a dispersive liquid crystal mode. According to Patent Literature 4, the contrast ratio is 101.

However, the techniques disclosed in Patent Literature 3 and 4 show relatively low contrast compared with other methods. Further, in order that the contrast is improved, the techniques require an improvement in light absorbability of the dichroic dye, an increase in a content of the dye, an increase in thickness of a guest-host liquid crystal cell. However, all of these will arise other problems such as technical problems, a decrease in reliability, a poor response property.

Patent Literatures 5 and 6 disclose methods of improving contrast by use of an optical compensation technique in which a liquid crystal panel and another liquid crystal panel for optical compensation are provided between a pair of polarizers.

In Patent Literature 5, a cell for display and a liquid crystal cell for optical compensation have different retardations in an STN mode. This improves a contrast ratio from 14 to 35.

Further, in Patent Literature 6, a liquid crystal cell for optical compensation is provided so as to compensate a wavelength dependence that a cell for liquid crystal display of a TN mode or the like mode exhibits during a black display. This improves a contrast ratio from 8 to 100.

Although the techniques disclosed in the aforementioned Patent Literatures respectively attain 1.2 times to 10 times or more improvement effects of the contrast ratio, an absolute value of the contrast ratio is merely about 35 through 420.

Moreover, as another technique for improving contrast, for example, Patent Literature 7 discloses a complex liquid crystal display device in which two liquid crystal panels are provided so as to overlap each other and their polarizers are positioned so as to form cross Nicols. According to Patent Literature 7, while a single panel shows a contrast ratio of 100, two panels overlapping each other can improve the contrast ratio by around three to four digit values.

Further, in order that a display quality of a liquid crystal display device is improved, it is desirable that, in addition to improvement in contrast, other display characteristics be improved. As another technique for improving a display quality, for example, there is a smoothing process of an image, as disclosed in Patent Literature 8. The smoothing process is carried out when a resolution of an image signal is lower than that of a display device. The smoothing process is carried out in such a manner that gradation levels of peripheral pixels are averaged so that jaggies are decreased, or the like manner.

Citation List

Patent Literature 1

Japanese Patent Application Publication, Tokukai, No. 2001-188120 A (Publication Date: Jul. 10, 2001)

Patent Literature 2

Japanese Patent Application Publication, Tokukai, No. 2002-90536 A (Publication Date: Mar. 27, 2002)

Patent Literature 3

Japanese Patent Application Publication, Tokukaishou, No. 63-25629 A (Publication Date: Feb. 3, 1988)

Patent Literature 4

Japanese Patent Application Publication, Tokukaihei, No. 5-2194 A (Publication Date: Jan. 8, 1993)

Patent Literature 5

Japanese Patent Application Publication, Tokukaishou, No. 64-49021 A (Publication Date: Feb. 23, 1989)

Patent Literature 6

Japanese Patent Application Publication, Tokukaihei, No. 2-23 A (Publication Date: Jan. 5, 1990)

Patent Literature 7

Japanese Patent Application Publication, Tokukaihei, No. 5-88197 A (Publication Date: Apr. 9, 1993)

Patent Literature 8

Japanese Patent Application Publication, Tokukaihei, No. 6-289833 A (Publication Date: Oct. 18, 1994)

SUMMARY OF INVENTION

However, a conventional smoothing process is not carried out in consideration of a conversion of gradation data according to γ-correction. This arises the following problem.

A panel for use in a conventional display is designed so as to have an output luminance characteristic expressed by a power function called γ-curve with respect to gradation data. A conversion of the gradation data according to the function is called γ-correction. This is because a signal supplied to a display has a tone-luminance characteristic of $1/\gamma=0.45$ ($\gamma=2.2$).

When the smoothing process is carried out by carrying out an average computing process with respect to gradation data, the gradation data is averaged in a state where the gradation data has a characteristic of $\gamma=2.2$. This causes a problem that a gradation characteristic of an averaged part also shows a curve of $\gamma=2.2$, so that resultant gradation does not appear evenly gradated. For example, when an image region in which a color varies from white to black is averaged, the image becomes such that a tone close to white continues and is drastically changed to black. In such a case, the gradation does not appear even for a human sense, and is lack of smoothness. That is, an intended purpose of the smoothing process is not surely achieved.

The present invention is accomplished in view of the above problem. An object of the present invention is to carry out an image display in which a color appears to evenly (i.e., smoothly) vary for human eyes, thereby attaining a display device having a high display quality.

In order to achieve the object, a method of the present invention for driving a display device that outputs an image based on a video source signal, includes the steps of: (a) carrying out a first gradation converting process with respect to a first gradation level of an inputted video source signal, (b) carrying out a smoothing process with respect to the inputted video source signal which has been subjected to the first gradation converting process, and (c) carrying out a second gradation converting process with respect to a second gradation level of the inputted video source signal which has been subjected to the smoothing process.

According to the method, the first gradation converting process and the second gradation converting process are carried out before and after the smoothing process. This makes it possible to carry out the smoothing process so that gradation of a displayed image appears smooth compared with a conventional method. In other words, the first gradation converting process is carried out to correct a tone-luminance characteristic of an inputted signal, and subsequently the smoothing process is carried out with respect to the inputted signal. With the above method, the second gradation converting process can be further carried out, for example, by profiling a gradation level of the inputted signal that has been subjected to the second gradation converting process, which gradation level allows tones of an output image to appear evenly gradated for human visual perception.

That is, the method of the present invention carries out correction of a tone-luminance characteristic in the step (a) followed by the step (b), in order to attain an intended purpose of the smoothing process that an edge is eliminated by smoothing gradation in an image region. Further, in the step (c) following the step (b), the second gradation level of the inputted signal that has been subjected to the smoothing process is reconverted so that gradation appears evenly gradated for human visual perception.

If the driving method of the present invention is applied, it is possible to realize a display device (i) which outputs a video image that has been subjected to the smoothing process which video image appears smoother for human eyes, and (ii) which can improve a display quality.

In the method of the present invention, it is preferable that in the step (c), the second gradation converting process be carried out such that as the second gradation level becomes larger, an increase rate of a gradation level of an output signal which has been subjected to the second gradation converting process with respect to the second gradation level increases.

It is generally said that sensitivity of human eyes for luminance is insensitive with respect to an increase in gradation levels. That is, even if a luminance value increases twice as much as an original value, the luminance appears not to increase so much for human visual perception. However, since a conventional smoothing process is carried out according to a simple averaging process, it is difficult to obtain smooth gradation.

According to the method of the present invention, in the step (c), the second gradation converting process is carried out in accordance with a function in which a gradient increases as the second gradation level becomes larger. This makes it possible to successfully carry out the smoothing process, which allows an output image to appear smoother for human eyes.

In the driving method of the present invention, in the step (b), the second gradation converting process may be carried out in accordance with a function in which a gradient increases as the first gradation level of the inputted video source signal becomes larger.

Further, in the driving method of the present invention, it is preferable that $O(X_1)=G_2(G_1(X_1))$ is satisfied where $X_1$ is the inputted video source signal, $O(X_1)$ is a function of luminance of the image to be outputted in response to the inputted video source signal $X_1$, $G_1(X_1)$ is a function of the video source signal $X_1$ that has been subjected to the first gradation converting process, $X_3$ is the inputted video source signal that has been subjected to the smoothing process, and $G_2(X_3)$ is a function of luminance of the inputted video source signal $X_3$ that has been subjected to the second gradation converting process.

With the above method, it is possible to carry out, in the step (a), correction of the first gradation level of the inputted video source signal having a tone-luminance characteristic of, for example, $\gamma=0.45$ so that a signal to be ultimately outputted has a tone-luminance characteristic of $\gamma=1$.

Further, according to the above method, when intended luminance (relative transmittance) of the image to be ultimately outputted from a display panel such as a liquid crystal panel is given as $O(X_1)$ (intended luminance), $G_1(X_1)$ is set so that $G_2(G_1(X_1))$ becomes the intended luminance $O(X_1)$. This allows luminance of the inputted video source signal that has been subjected to the second gradation converting process to be the intended luminance.

In the driving method, $G_2(X_3)$ is preferably an exponential function.

According to the method, $G_2(X_3)$ is an exponential function in which an output value linearly change on a log scale. This enables profiling of a gradation level that allows tones of the image to appear more evenly gradated for human visual perception.

In the driving method, $G_2(X_3)$ is preferably $K\times X_3^3$ [K is a constant].

According to the method, $G_2(X_3)$ is $K\times X_3^3$ [K is a constant], and this enables profiling of a gradation level that allows tones the image to appear more evenly gradated for human visual perception.

In the method of the present invention, it is preferable that $G_2(X_3)$ be changed over from the exponential function to $K\times X_3^3$ [K is a constant] or vice versa depending on a gradation level of the inputted video source signal $X_3$.

With the above method, the gradation converting process can be carried out in accordance with the exponential function or $K\times X_3^3$, depending on a gradation level of the inputted video source signal. That is, the function to be used is optimally selected from them so that the second gradation converting process is carried out desirably depending on the gradation level, thereby allowing a display quality of a display device to be more improved.

Having both elements of the exponential function and $K\times X_3^3$ [K is a constant] means whether the gradation converting process is carried out by (i) a converting process according to the exponential function or (ii) a converting process according to $K\times X_3^3$ [K is a constant] depends on a value of $X_3$ to be inputted.

In accordance with a power function such as $K\times X_3^3$ [K is a constant], $0^3=0$. However, in a display in which a gradation level does not completely become zero (i.e., black is not completely expressed), it is difficult to express a gradation level close to zero. In such a case, the second gradation converting process is carried out according to the exponential function with respect to a low gradation region in which a gradation level is, for example, not more than 16. This makes it possible to express the gradation level close to 0. On this account, it is preferable, for example, that the second gradation converting process be carried out according to the exponential function in the low gradation region in which a gradation level is not greater than 16, and the second gradation converging process be carried out according to $K \times X_3^3$ [K is a constant] in a high gradation region in which a gradation level is greater than 16.

The constant K is determined as follows.

O and $G_2$ are functions of luminance. For example, in a case of 8 bits, when X=255, a white display is carried out and output luminance is 500 cd/m$^2$. When X=255, X$^3$=16581375, therefore, 500=K×16581375. Accordingly, K=500/16581375=3.02e-5.

In the method of the present invention, it is preferable that the step (a) (the first gradation converting step) be carried out by referring to a lookup table in which a first gradation level of the inputted video source signal is correlated with a gradation level of the inputted video source signal which has been subjected to the first gradation converting process.

With the method, by simply storing the lookup table in a recording medium such as ROM, it is possible to determine, by referring to the lookup table, a gradation level of the inputted video source signal that has been subjected to the first gradation converting process. This makes it possible to provide a display device at a low cost without complicating a driving circuit of the display device.

In the method of the present invention, when $G_2(X_3)$ is an exponential function $A \cdot B^{X_3}$ (A and B are constants) and $O(X_1)$ is $C \cdot X_1^{2.2}$ (C is a proportional constant), $G_1(X_1)=2.2 \cdot \log B(C/A \cdot X_1)$ may be satisfied.

Further, in the method of the present, when $G_2(X_3)$ is $K \times X_3^3$ (K is a constant) and $O(X_1)$ is $C \cdot X_1^{2.2}$ (C is a proportional constant), $G_1(X_1)=\{C/K \cdot X_1^{2.2}\}^{0.33}$ may be satisfied.

A liquid crystal display device of the present invention is one to which any one of the aforementioned methods for driving a display device is applied. The arrangement allows the liquid crystal display device (i) to output a video image that has been subjected to the smoothing process so that the video image appears smoother for human eyes and (ii) to produce a video image with a high display quality.

The liquid crystal display device includes two or more liquid crystal panels that are stacked with each other, and a plurality of polarized light absorbing layers between which the liquid crystal panels are sandwiched so that relations of crossed Nicols are established, each of the liquid crystal panels outputting image data in accordance with a video source signal. In the liquid crystal display device, it is preferable that at least one of the liquid crystal panels output image data that has been subjected to the smoothing process.

When an image is displayed on two liquid crystal panels stacked with each other and the panels are viewed at oblique angles, the image appears double due to parallax between the two panels. However, in the above arrangement, at least either one of the liquid crystal panels outputs an image that has been subjected to the smoothing process, thereby reducing such a phenomenon. The arrangement can especially successfully smooth an image having an edge and the image that has been subjected to the smoothing process hardly appears double.

Especially, if the smoothing process is carried out in the bottom most one of the plurality of liquid crystal panels, since a boundary between a white display and a black display in an image blurs, it is possible to prevent that the boundary in the image displayed on the bottom most liquid crystal panel stands out due to the parallax, thereby preventing that an image displayed on the display device appears double.

In the liquid crystal display device, when a first liquid crystal panel is the top most one of the stacked liquid crystal display panels, the first liquid crystal panel is a color liquid crystal panel and at least one of the other stacked liquid crystal display panels is a black and white liquid crystal panel, and it is preferable that the black and white liquid crystal panel output image data that has been subjected to the smoothing process.

The above arrangement makes it possible to blur, by the smoothing process, an edge of an image displayed on the black and white liquid crystal panel disposed on a back of the color liquid crystal panel. This can improve a display quality of a liquid crystal display device including two liquid crystal panels that are stacked with each other.

In order to achieve the object, a driving circuit of the present invention, for use in a display device that outputs an image based on a video source, which supplies image data to a display panel, includes: a first gradation level converting process circuit that carries out a first gradation converting process with respect to a first gradation level of an inputted video source signal; a smoothing process circuit that carries out a smoothing process with respect to the inputted video source signal which has been subjected to the first gradation converting process; and a second gradation level converting process circuit that carries out a second gradation level converting process with respect to a second gradation level of the inputted video source signal which has been subjected to the smoothing process.

With the above driving circuit, since the first gradation converting process circuits are provided precedently to and subsequently to the smoothing process circuits as such, it is possible to carry out the smoothing process so that gradation of a displayed image appears smooth compared with a conventional display device. That is, the first gradation converting process is carried out to correct a tone-luminance characteristic of an inputted signal, and subsequently the smoothing process is carried out with respect to the inputted signal. With the arrangement, the second gradation converting process can be further carried out with respect to the inputted signal that has been subjected to the smoothing process, for example, by profiling a gradation level of the inputted signal that has been subjected to the second gradation converting process, which gradation level allows tones of an output image to appear evenly gradated for human visual perception.

As a result, with the use of the driving circuit of the present invention, it is possible to realize a display device (i) which can output a video image that has been subjected to the smoothing process which video image appears smoother for human eyes, and (ii) which can improve a display quality.

A liquid crystal display device of the present invention includes the driving circuit. The arrangement allows the liquid crystal display device (i) to output a video image that has been subjected to the smoothing process which video image appears smoother for human eyes and (ii) to produce a video image with a high display quality.

The liquid crystal display device includes: two or more liquid crystal panels that are stacked with each other; and a plurality of polarized light absorbing layers between which the liquid crystal panels are sandwiched so that relations of crossed Nicols are established, each of the liquid crystal panels outputting image data in accordance with a video source signal. In the liquid crystal display device, it is preferable that at least one of the liquid crystal panels output image data that has been subjected to the smoothing process.

When an image is displayed on two liquid crystal panels stacked with each other and the panels are viewed at oblique angles, the image appears double due to parallax between the two panels. However, in the above arrangement, at least either one of the liquid crystal panels outputs an image that has been subjected to the smoothing process, thereby avoiding such a phenomenon. The arrangement can especially successfully smooth an image having an edge and the image that has been subjected to the smoothing process as such hardly appears double.

In the liquid crystal display device, when a first liquid crystal panel is the top most one of the stacked liquid crystal panels, the first liquid crystal panel is a color liquid crystal panel and at least one of the other stacked liquid crystal panels is a black and white liquid crystal panel, and it is preferable that the black and white liquid crystal panel output image data that has been subjected to the smoothing process.

The above arrangement makes it possible to blur, by the smoothing process, an edge of an image displayed on the black and white liquid crystal panel disposed on a back of the color liquid crystal panel. This can improve a display quality of a liquid crystal display device including two liquid crystal panels that are stacked with each other.

A liquid crystal display device to which any one of the methods of the present invention and the aforementioned liquid crystal display devices can be used as a display device provided in a television receiver that includes a tuner section for receiving a television broadcast, and a display device for displaying the television broadcast received by the tuner section.

For a fuller understanding of the nature and advantages of the invention, reference should be made to the ensuing detailed description taken in conjunction with the accompanying drawings.

BRIEF DESCRIPTION OF DRAWINGS

FIG. 10($b$) is an explanation view of a contrast improvement mechanism.

FIG. 10($c$) is an explanation view of a contrast improvement mechanism.

FIG. 11($b$) is an explanation view of a contrast improvement mechanism.

FIG. 11($c$) is an explanation view of a contrast improvement mechanism.

FIG. 11($d$) is an explanation view of a contrast improvement mechanism.

FIG. 12($b$) is an explanation view of a contrast improvement mechanism.

FIG. 12($c$) is an explanation view of a contrast improvement mechanism.

FIG. 13($b$) is an explanation view of a contrast improvement mechanism.

FIG. 14($b$) is an explanation view of a contrast improvement mechanism.

FIG. 14($c$) is an explanation view of a contrast improvement mechanism.

FIG. 15($b$) is an explanation view of a contrast improvement mechanism.

FIG. 16($b$) is an explanation view of a contrast improvement mechanism.

FIG. 17($b$) is a cross-sectional view illustrating a structure of a liquid crystal display device in a PVA mode, to which a voltage is being applied.

FIG. 22 illustrates an LUT used for a gradation converting process carried out in a first gradation converting process circuit illustrated in FIG. 21.

FIG. 25 illustrates an LUT used for a gradation converting process carried out in a first gradation converting process circuit illustrated in FIG. 24.

REFERENCE SIGNS LIST

201: Scan Signal Line
202: Auxiliary Capacitance Line
203: TFT Element
204: Data Signal Line
205: Drain Lead-out Line
206: Auxiliary Capacitor Forming Electrode
207: Interlayer Insulating Film
208: Pixel Electrode
210: Transparent Substrate
211: Slit Pattern
212 *a* to 12*f*: Slit
220: Color Filter Substrate
220': Counter Substrate
221: Color Filter
222: Projection
223: Counter Electrode
224: Black Matrix
225: Vertical Alignment Film
226: Liquid Crystal
230: Active Matrix Substrate
100: Liquid Crystal Display
101*a*, 101*b*, 101*c*: Polarizer (Polarized Light Absorbing Layer)
600: Tuner Section
601: Liquid Crystal Display Device (Display Device)
700*a*: Panel Drive Circuit (Driving Circuit)
700*b*: Panel Drive Circuit (Driving Circuit)
701, 711: First Gradation Converting Process Circuit
702, 712: Smoothing Process Circuit
703, 713: Second Gradation Converting Process Circuit Description of Embodiments In the following Embodiments, the present invention is applied to liquid crystal display devices. Since the liquid crystal display devices are shutter-type display devices, a video image is displayed normally by controlling transmission light by a combination with a light source called backlight. From this reason, in the following description, "transmittance" or standardized "relative transmittance" is used as an expression corresponding to luminance.

Figure 8:
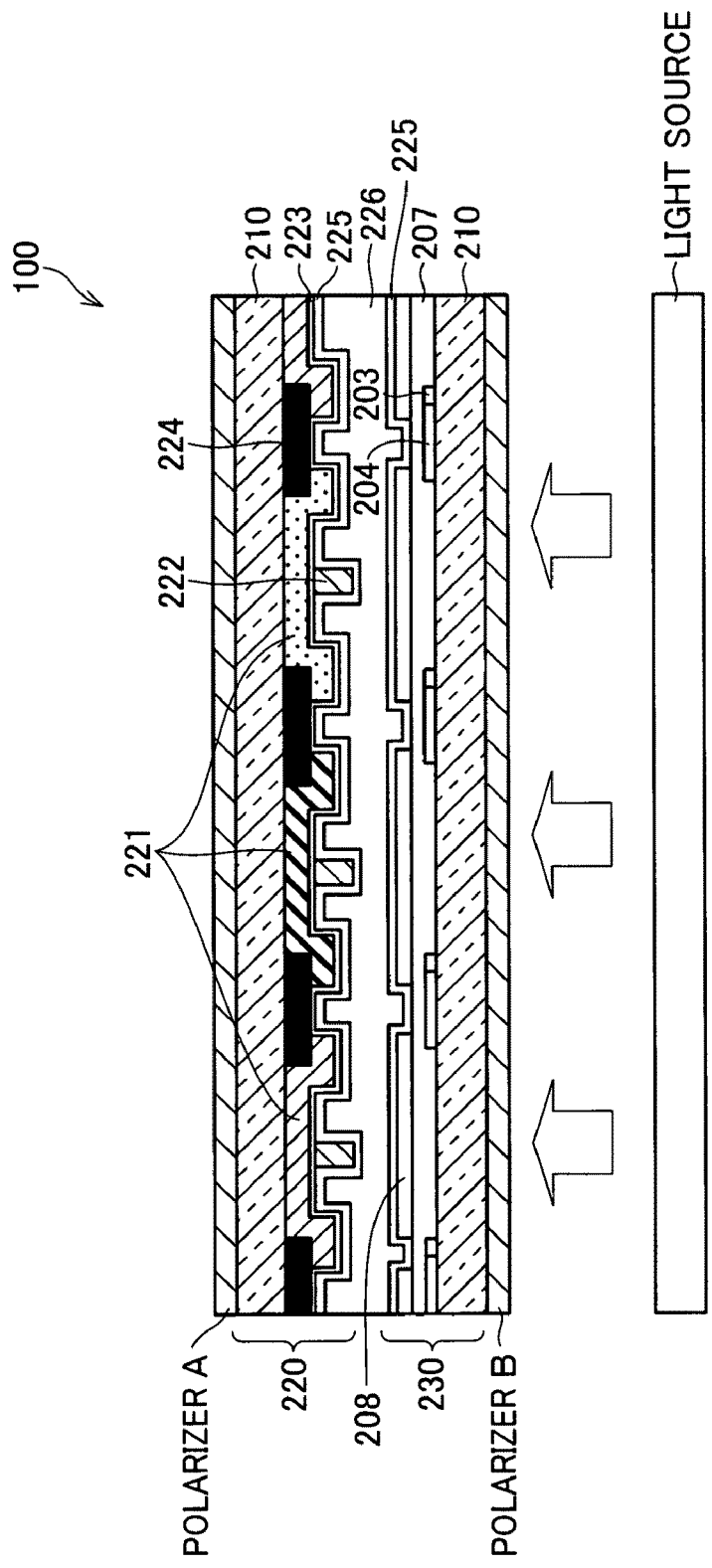
FIG. 8 is a diagrammatic cross-sectional view of a liquid crystal display device with a single liquid crystal panel.

A general liquid crystal display device is arranged such that polarizers (polarized light absorbing layers) A and B are attached to a liquid crystal panel in which a color filter and a drive substrate are provided, as illustrated in FIG. 8. The following explains about an MVA (Multidomain Vertical Alignment) mode.

Figure 9:
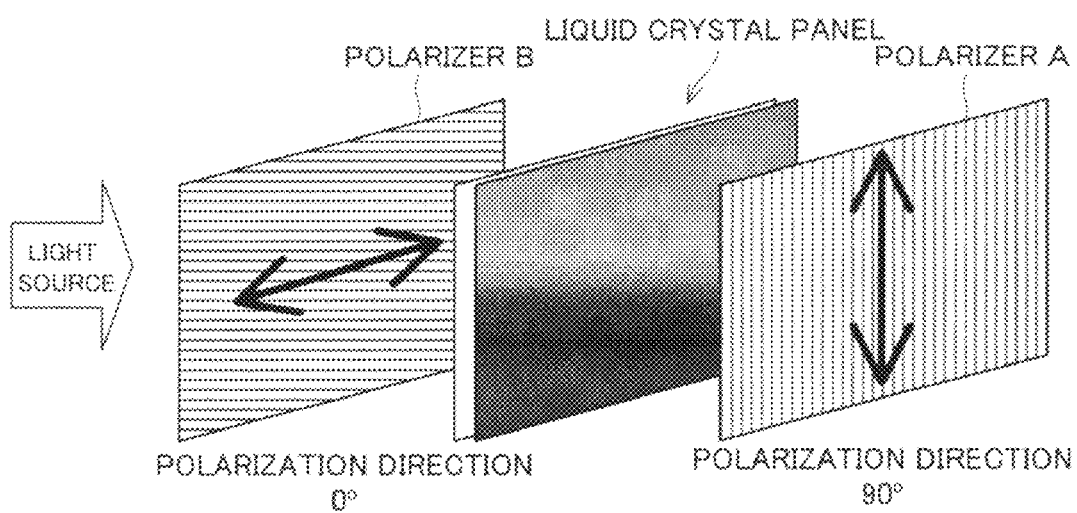
FIG. 9 illustrates a positioning of polarizers and a panel in the liquid crystal display device of FIG. 8.

As illustrated in FIG. 9, the polarizers A and B are positioned so that polarization axes are perpendicular to each other, and alignment of a liquid crystal is set to tilt at an azimuth of 45° with respect to the polarization axes of the polarizers A and B while a threshold voltage is being applied to pixel electrodes 208. In the arrangement, since a polarization axis of light, which is incident on and polarized by the polarizer A, is rotated when passing though a liquid crystal layer, the light comes out from the polarizer B. Further, when a voltage not more than the threshold voltage is just applied to the pixel electrodes, the liquid crystal is aligned perpendicularly to the substrate. In this case, a polarization angle of the polarized incident light is not changed, with the result that a black display is carried out. In the MVA mode, an orientation direction in which the liquid crystal tilts while a voltage is being applied is divided into four directions (Multidomain), thereby realizing a high viewing angle.

However, a panel for use in a conventional display is designed so that an output luminance characteristic exhibits a power function called γ curve with respect to gradation data. This is because a signal supplied to a display has a tone-luminance characteristic of 1/γ. When a smoothing process is carried out such that the gradation data is subjected to a simple average computing process, a gradation characteristic of an averaged part also shows the γ curve, and a smooth gradation is not obtained. In this case, in the averaged part in which a color varies, for example, from white to black, a tone close to white continues and is drastically changed to black. As a result, the gradation does not appear evenly gradated for human perception, and is lack of smoothness.

The present invention is to provide a method for driving a display device that outputs a video image that has been subjected to a smoothing process so that the video image appears smooth. The present invention will be described as below with reference to the following embodiments dealing with various liquid crystal display devices each having a different arrangement, as display devices to which the driving method of the present invention is applied.

[Embodiment 1]

Embodiment 1 deals with a case where the present invention is applied to a high-contrast liquid crystal display device in which two liquid crystal panels are used.

First, explained are an arrangement and a mechanism of the high-contrast liquid crystal display device.

A normal liquid crystal display device having a double-polarizer structure has a limit in contrast improvement. In this regard, the inventors of the present invention have found that use of three polarizers (polarized light absorbing layers, each of which is positioned so as to form crossed Nicols) in combination with two liquid crystal display panels improves shutter performance in both front and oblique angles.

The following explains about a mechanism of contrast improvement.

More specifically, the inventors of the present invention have found the followings.

(1) Front Angle

Depolarization (scattering of CF and the like) in the panels causes leakage of light in a direction of a transmission axis of crossed Nicols. In a triple-polarizer structure described above, a third polarizer is positioned such that its absorption axis accords with leaking light in a direction of a transmission axis of a second polarizer, thereby eliminating the leakage.

(2) Oblique Angle

Changes in leakage become less sensitive to an increasing Nicol angle φ of a polarizer, that is, black is less likely to lose its depth with an increasing Nicol angle φ at oblique viewing angles.

Figure 10:
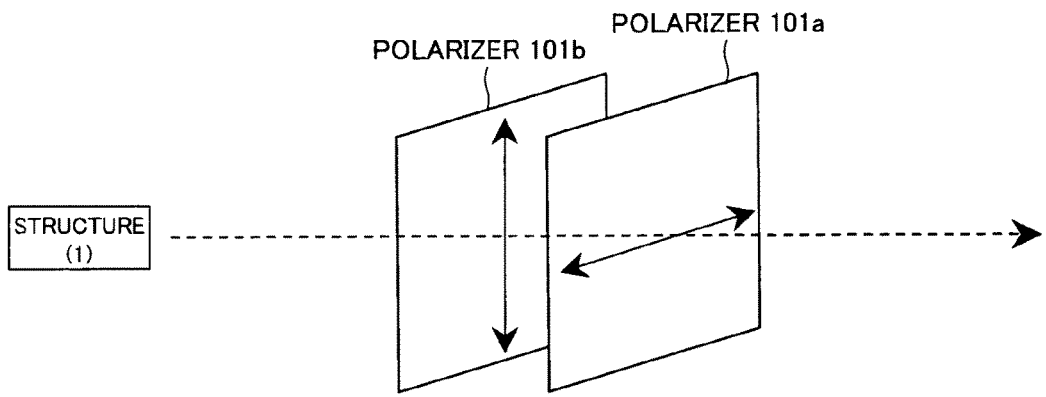
FIG. 10($a$) is an explanation view of a contrast improvement mechanism.
Figure 10:
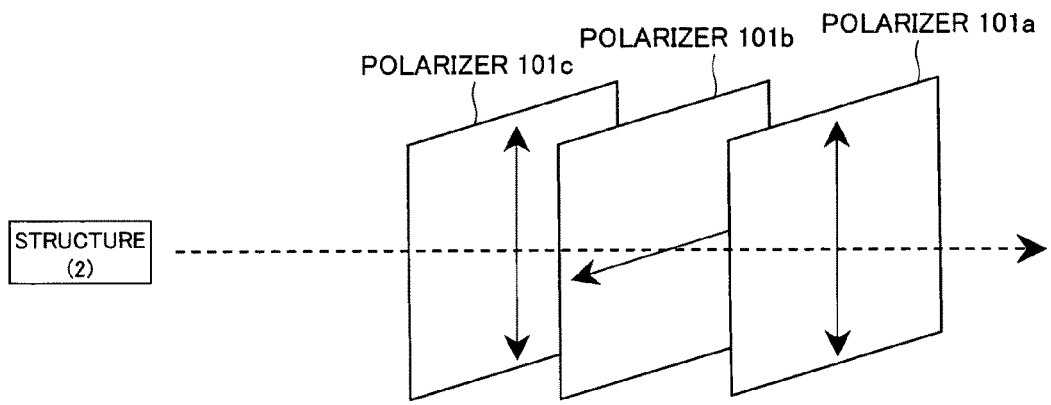
Figure 10:
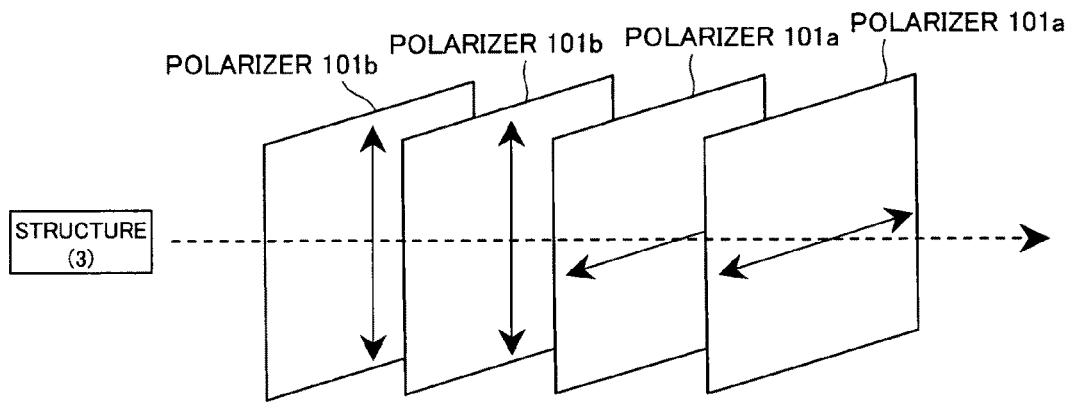

From these findings, the inventors have found that the triple-polarizer structure greatly improves the contrast of the liquid crystal display. The following will discuss a contrast improvement mechanism with reference to FIGS. 10(*a*) through 16(*b*), and Table 1. The double-polarizer structure will be referred to as structure (1), and the triple polarizer structure as structure (2). Since the contrast improvements in oblique directions are attributable essentially to polarizer structure, the modeling here is based only on polarizers, involving no liquid crystal panel.

FIG. 10(a) depicts an example of the structure (1) with a single liquid crystal display panel, in which two polarizers 101a and 101b are disposed to form crossed Nicols. FIG. 10(b) depicts an example of the structure (2), in which three polarizers 101a, 101b, and 101c are disposed to form crossed Nicols. Since the structure (2) includes two liquid crystal display panels, there are two pairs of polarizers which are disposed to form crossed Nicols. FIG. 10(c) depicts an example in which a polarizer 101a and a polarizer 101b disposed face to face to form crossed Nicols; an additional polarizer of the same polarization direction is disposed outside each of the polarizers. Although FIG. 10(c) illustrates a structure in which four polarizers are provided, polarizers which form crossed Nicols are only a pair of them that sandwich a single liquid crystal display panel.

A transmittance with which a liquid crystal display panel carries out a black display is modeled by treating the transmittance as a transmittance when polarizers without liquid crystal panels are positioned so as to form crossed Nicols, that is, a cross transmittance. Herein, the resultant transmittance model is referred to as a black display. Meanwhile, a transmittance with which a liquid crystal display device carries out a white display is modeled by treating the transmittance as a transmittance when polarizers without liquid crystal display panels are positioned so as to form parallel Nicols, that is, a parallel transmittance. Herein, the resultant transmittance model is referred to as a white display. FIG. 11(a) through FIG. 11(d) show graphs showing examples of a relationship between wavelength and transmittance in a transmission spectrum when the polarizers are viewed from the front and in oblique angles. The modeled transmittances are ideal values of transmittances in white and black displays in a mode in which polarizers are positioned to form crossed Nicols, and a liquid crystal display is sandwiched therebetween.

Figure 11:
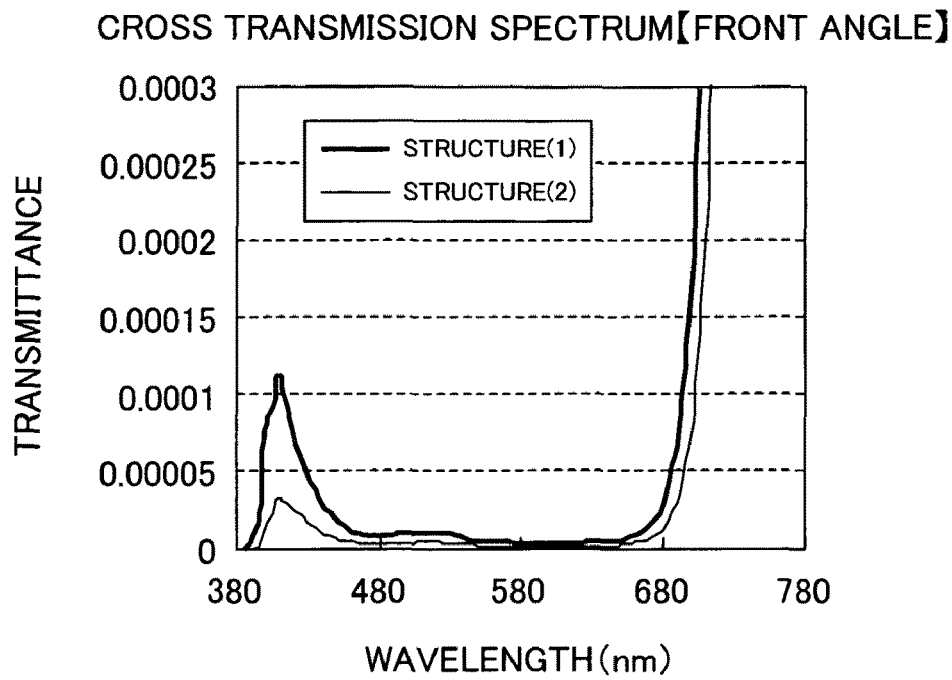
FIG. 11($a$) is an explanation view of a contrast improvement mechanism.
Figure 11:
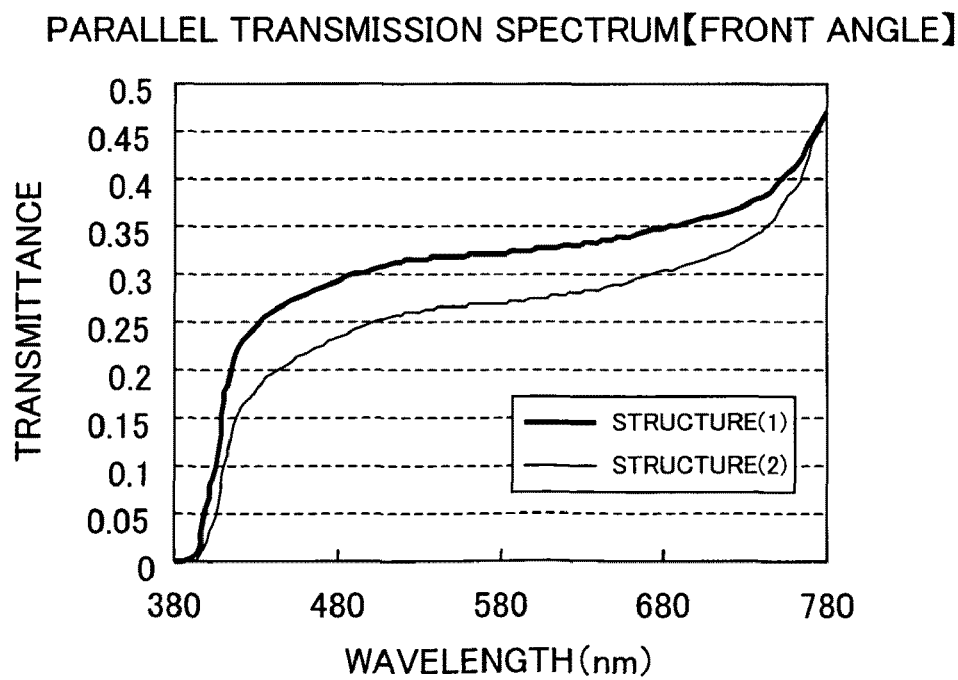
Figure 11:
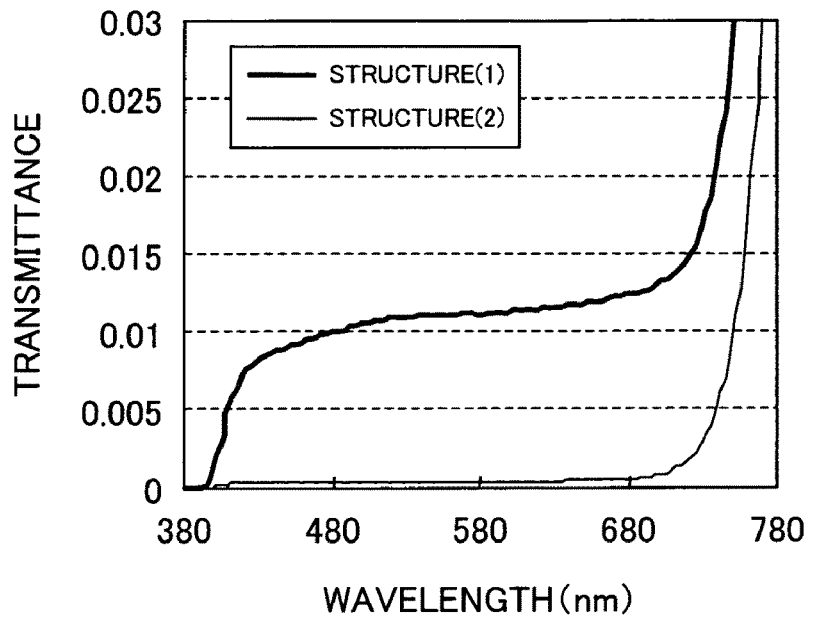
Figure 11:
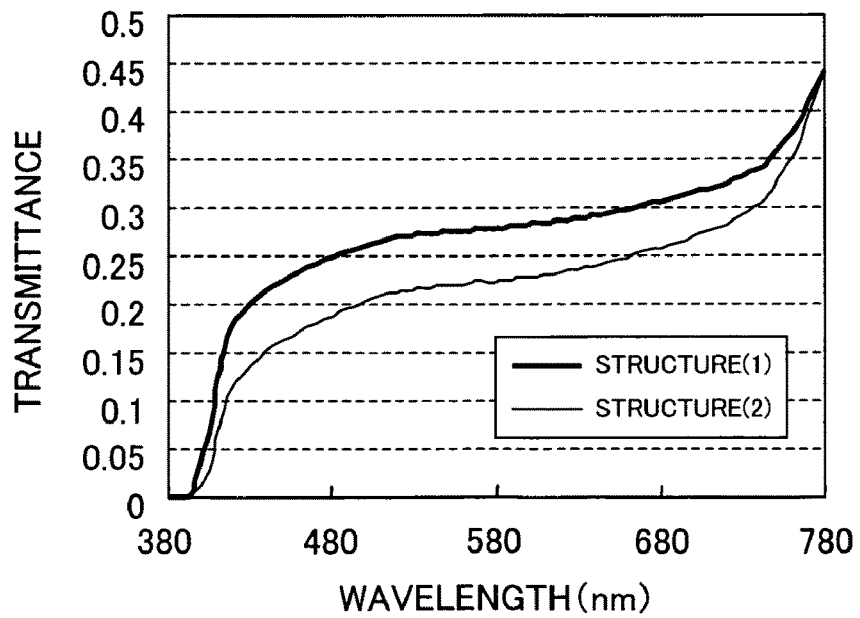

FIG. 11(a) is a graph showing a relationship between wavelength and cross transmittance in a transmission spectrum of the structures (1) and (2) for comparison when polarizers are viewed from the front. The graph demonstrates that the structures (1) and (2) exhibit similar transmittance properties when a black display is viewed from the front.

FIG. 11(b) is a graph showing a relationship between wavelength and parallel transmittance in a transmission spectrum of the structures (1) and (2) for comparison when polarizers are viewed from the front. The graph demonstrates that the structures (1) and (2) exhibit similar transmittance properties when a white display is viewed from the front.

FIG. 11(c) is a graph showing a relationship between wavelength and cross transmittance in a transmission spectrum of the structures (1) and (2) for comparison when polarizers are viewed at oblique angles (azimuth: 45°—polar angle: 60°). The graph demonstrates that the structure (2) exhibits an almost zero transmittance at almost all wavelength bands, whereas the structure (1) exhibits a little light transmission at almost all the wavelength bands. In other words, the double-polarizer structure suffers light leakage (hence, loses crispness in blacks) when a black display is viewed at oblique viewing angles. On the other hand, the triple-polarizer structure restrains light leakage (hence, retains crispness in blackness) when a black display is viewed at oblique viewing angles.

FIG. 11(d) is a graph showing a relationship between wavelength and parallel transmittance in a transmittance spectrum of the structures (1) and (2) for comparison when polarizers are viewed at oblique angles (azimuth: 45°13 polar angle: 60°). The graph demonstrates that the structures (1) and (2) exhibit similar transmittance properties when a white display is viewed at oblique angels.

As shown in FIGS. 11(b) and 11(d), in the white display, the transmittance properties are almost the same regardless of the number of polarizers used, in other words, the number of Nicol pairs provided by the polarizers and also regardless of whether the display is viewed from the front or at oblique angles.

However, as shown in FIG. 11(c), in the black display, the structure (1) having one Nicol pair causes black to be less crisp at oblique viewing angles, but the structure (2) having two Nicol pairs restrains black from being less crisp at oblique viewing angles.

For example, Table 1 shows values of transmittance at a wavelength of 550 nm of a transmittance spectrum for the front and oblique angles.

TABLE 1

|  | 550 nm | | | | | |
|  | Front Structure | | | Oblique Position (45-60°) Structure | | |
|  | (1) | (2) | (2)/(1) | (1) | (2) | (2)/(1) |
| Parallel | 0.319 | 0.265 | 0.832 | 0.274499 | 0.219084 | 0.798 |
| Cross | 0.000005 | 0.000002 | 0.4 | 0.01105 | 0.000398 | 0.0360 |
| Parallel/Cross | 63782 | 132645 | 2.1 | 24.8 | 550.5 | 22.2 |

In Table 1, "Parallel" denotes parallel transmittance, or the transmittance in white display; "Cross" denotes cross transmittance, or the transmittance in black display; and "Parallel/Cross" therefore denotes contrast.

From Table 1, it is demonstrated that the contrast for the front on the structure (2) is about twice as high as that on the structure (1) and also that the contrast for oblique angles on the structure (2) is about 22 times as high as that on the structure (1). The contrast for oblique angles shows great improvements.

Figure 12:
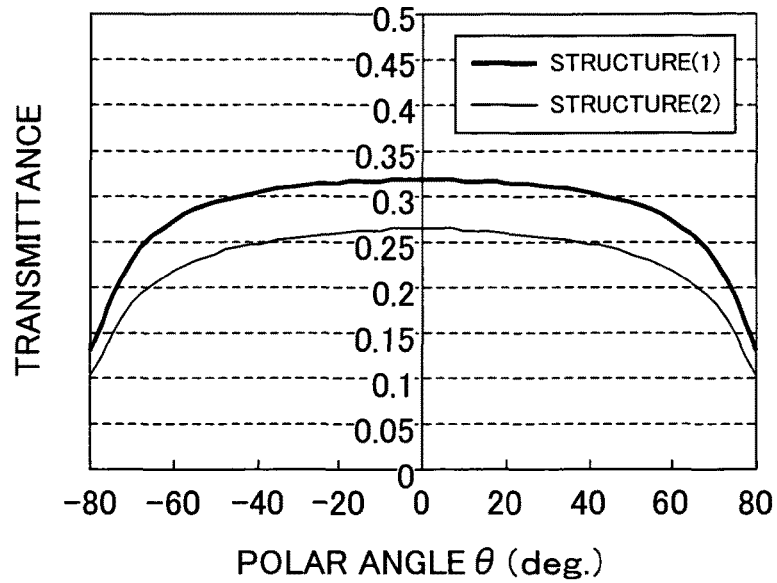
FIG. 12($a$) is an explanation view of a contrast improvement mechanism.
Figure 12:
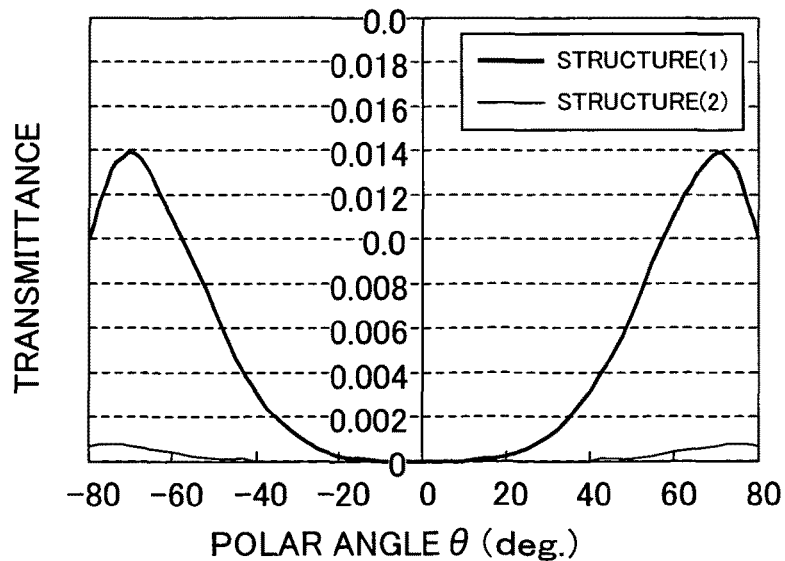
Figure 12:
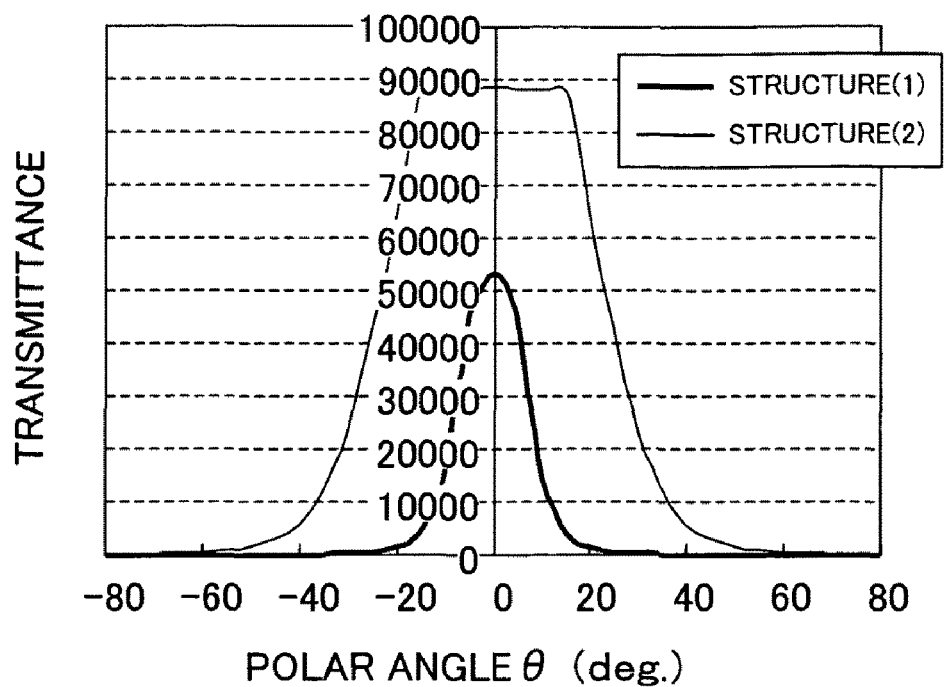

The following deals with viewing angle characteristics for white display and black display with reference to FIGS. 12(a) through 12(c). In the followings, an azimuth is 45° with respect to polarizers, and a wavelength of a transmission spectrum is 550 nm.

FIG. 12(a) is a graph showing a relationship between polar angle and transmittance in white display. The graph demonstrates that the structure (2) exhibits a lower transmittance than the structure (1) across the range. However, in this case, the structures (2) and (1) have similar viewing angle characteristics (parallel viewing angle characteristics).

FIG. 12(b) is a graph showing a relationship between polar angle and transmittance in black display. The graph demonstrates the structure (2) restrains its transmittance at oblique viewing angles (around a polar angle of ±80°). On the other hand, the structure (1) exhibits an increased transmittance at oblique viewing angles. That is, it is demonstrated that black significantly appears less crisp at oblique viewing angles in the structure (1), compared with the structure (2).

FIG. 12(c) is a graph showing a relationship between polar angle and contrast. The graph demonstrates that the structure (2) exhibits far better contrast than the structure (1). The graph for the structure (2) in FIG. 12(c) becomes flat around 0°. This is because the transmittance for black drops so sharply by orders of magnitudes that calculation cannot be carried out. The particular part of the graph is actually a smooth curve.

Figure 13:
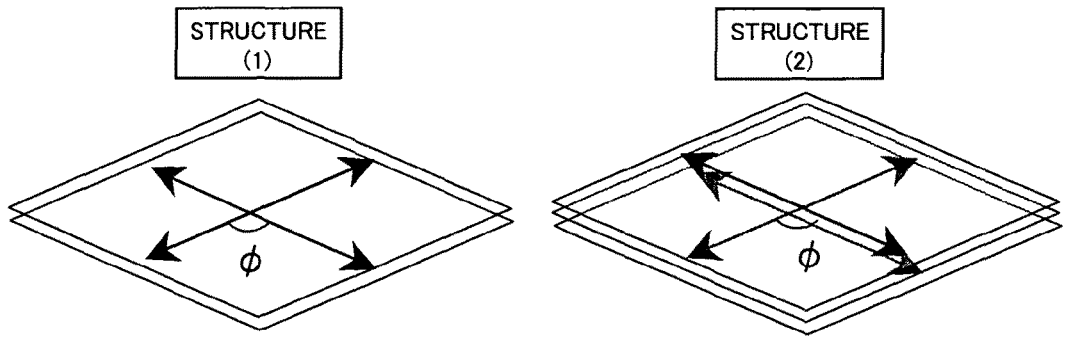
FIG. 13($a$) is an explanation view of a contrast improvement mechanism.
Figure 13:
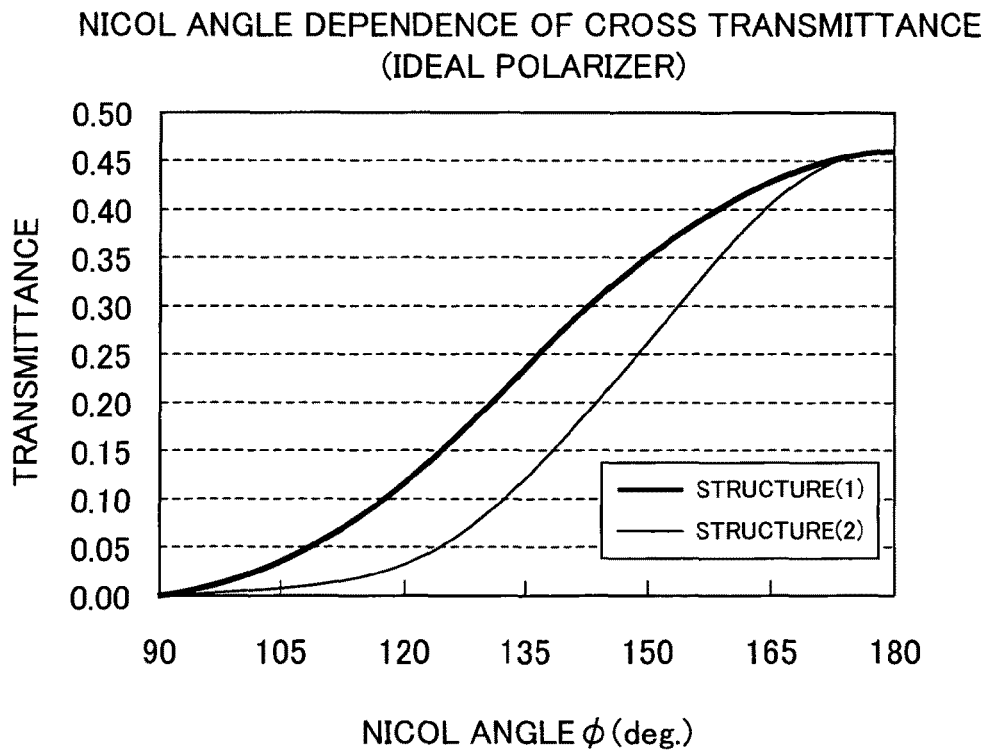

By referring to FIGS. 13(a) and 13(b), the following describes that the changes in light leakage becomes less sensitive with respect to an increasing Nicol angle φ of polarizers, that is, black becomes less crisp with respect to an increase in Nicol angle φ at oblique viewing angles. The Nicol angle φ of polarizers indicates an angle in a state where, as illustrated in FIG. 13(a), polarization axes of polarizers positioned so as to face each other are skew. FIG. 13(a) is a perspective view of polarizers positioned so as to form crossed Nicols. In the figure, a Nicol angle φ deviates from 90° (the deviation is the increase in Nicole angle).

FIG. 13(b) is a graph showing a relationship between Nicole angle φ and cross transmittance. Calculation is carried out based on an ideal polarizer (parallel Nicols transmittance: 50%, crossed Nicols transmittance 0%). The graph demonstrates that the transmittance changes less with respect to a change in Nicol angle φ in the structure (2) than in the structure (1), in black display. That is, the triple-polarizer structure is less affected by the change in Nicole angle φ than the double-polarizer structure.

Figure 14:
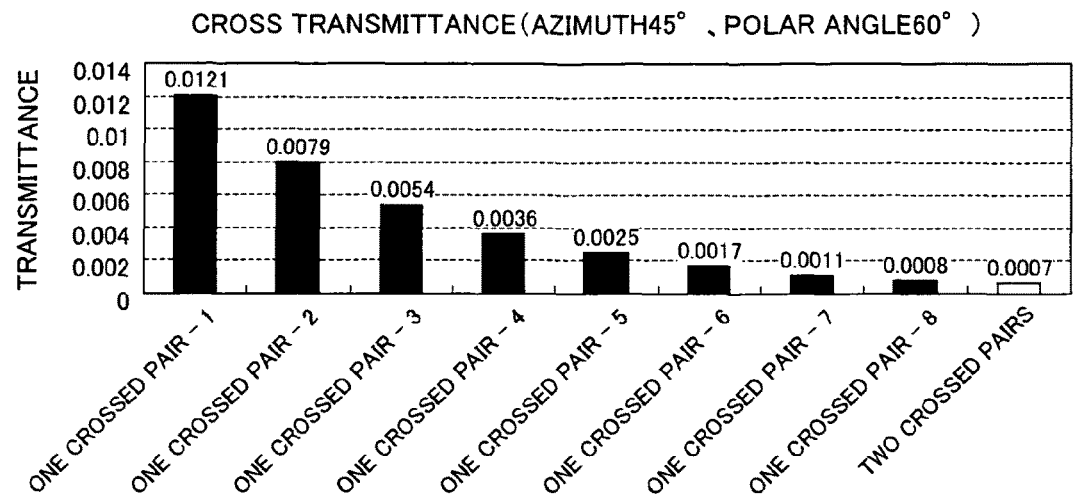
FIG. 14($a$) is an explanation view of a contrast improvement mechanism.
Figure 14:
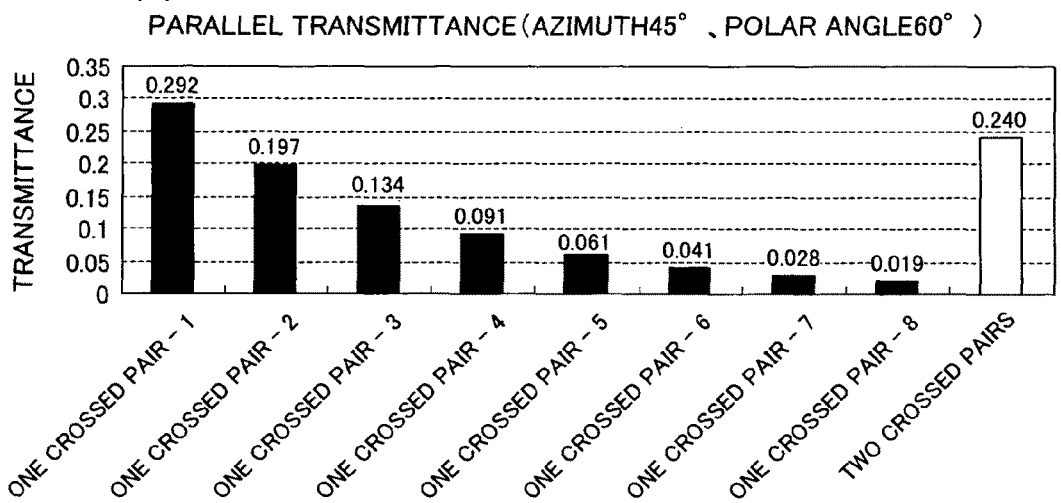
Figure 14:
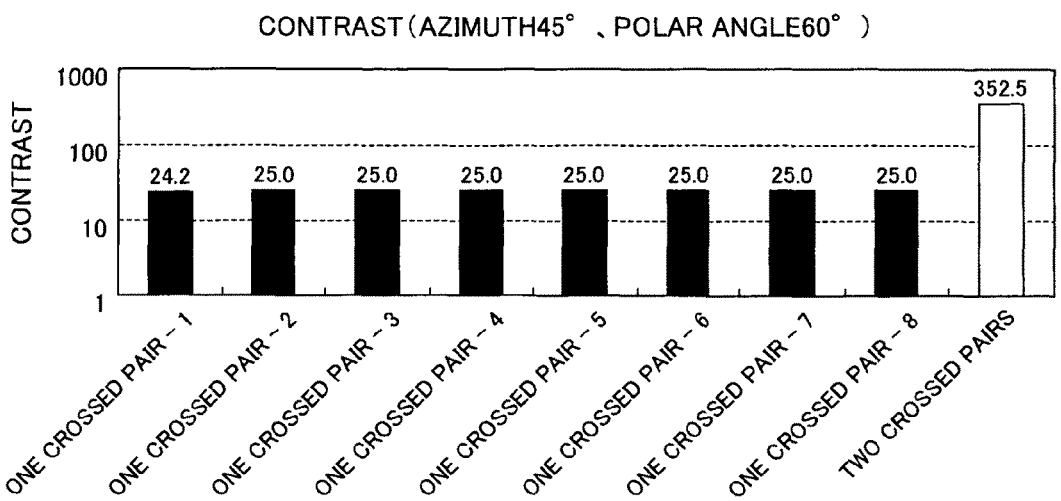

The following deals with a thickness dependence of a polarizer, with reference to FIGS. 14(a) through 14(c). The thickness of the polarizer is adjusted so as to be the structure (3), as illustrated in FIG. 10(c), in which polarizers having the same polarization axes are added one by one to a pair of crossed Nicols polarizers. FIG. 10(c) illustrates an example in which a pair of crossed Nicols polarizers 101a and 101b are sandwiched by another pair of crossed Nicols polarizers 101a and 101b having polarization axes in the same polarization directions as those of the first pair. In this structure, two other polarizers are included in addition to the first pair of crossed Nicols polarizers. The structure is referred to as "one crossed pair—2". Likewise, with additional polarizer, structures are respectively referred to as "one crossed pair—3", "one crossed pair—4", . . . . In graphs shown in FIGS. 14(a) through 14(c), each value is measured at an azimuth of 45° and a polar angle of 60°.

FIG. 14(a) is a graph showing a relationship between thickness and transmittance (cross transmittance) in a pair of crossed Nicols polarizers in black display. The graph also shows a transmittance of two pairs of crossed Nicol polarizers for comparison.

FIG. 14(b) is a graph showing a relationship between thickness and transmittance (parallel transmittance) in a pair of crossed Nicols polarizers in white display. The graph also shows a transmittance of two pairs of crossed Nicols polarizers for comparison.

The graph shown in FIG. 14(a) demonstrates that addition of polarizers can decrease the transmittance in black display. However, the graph shown in FIG. 14(b) demonstrates that the addition of polarizers decreases the transmittance in white display. That is, simply adding polarizers for the sake of restraining black to be less crisp in black display causes the transmittance to be decreased in white display.

Further, FIG. 14(c) is a graph showing a relationship between thickness and contrast in one pair of crossed Nicols polarizers. The graph also shows a contrast of two pairs of crossed Nicols polarizers for comparison.

From the graphs shown in FIGS. 14(a) through 14(c), it is demonstrated that the structure of two pairs of crossed Nicols polarizers can restrain reduced crispness of black in black display and prevent a decrease in transmittance in white display. In addition, the two pairs of crossed Nicols polarizers are constituted by three polarizers in total. This can largely improve the contrast without increasing an entire thickness of a liquid crystal display device.

Figure 15:
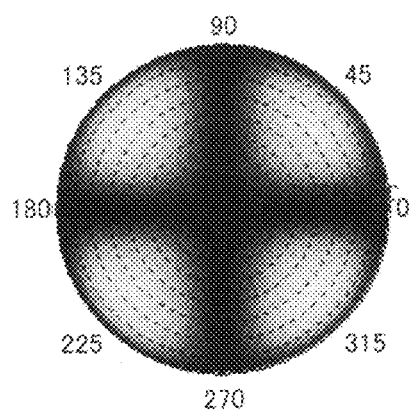
FIG. 15($a$) is an explanation view of a contrast improvement mechanism.
Figure 15:
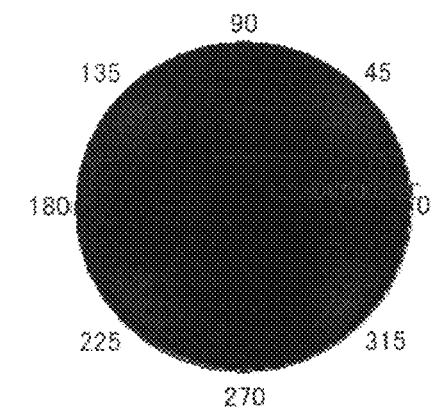

FIGS. 15(a) and 15(b) show viewing angle characteristics of the crossed Nicole transmittance in a specific manner. FIG. 15(a) shows a viewing angle characteristic of crossed Nicols in the structure (1), i.e., the double-polarizer structure in a pair of crossed Nicols. FIG. 15(b) shows a viewing angle characteristic of crossed Nicols in the structure (2), i.e., the triple-polarizer structure in two pairs of crossed Nicols.

As shown in FIGS. 15(a) and 15(b), the structure with two pairs of crossed Nicols hardly exhibit loss of crispness of black (an increase in transmittance in black display). This advantage is evident especially at 45°, 135°, 225°, and 315°.

Figure 16:
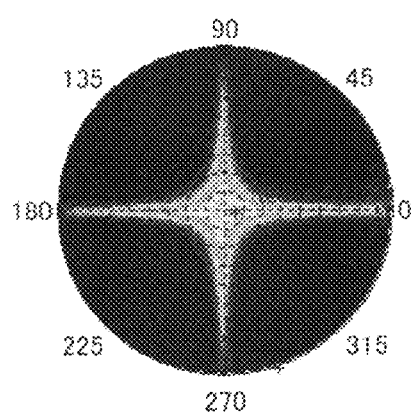
FIG. 16($a$) is an explanation view of a contrast improvement mechanism.
Figure 16:
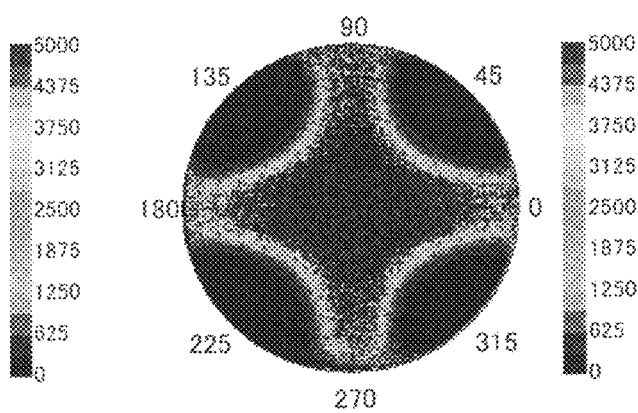

Further, FIGS. 16(a) and 16(b) show viewing angle characteristics (parallel/cross luminance) of contrast in a specific manner. FIG. 16(a) shows a viewing angle characteristic of contrast in the structure (1), i.e., the double-polarizer structure of a pair of crossed Nicols. FIG. 16(b) shows a viewing angle characteristic of contrast in the structure (2), i.e., the triple-polarizer structure of two pairs of crossed Nicols.

As shown in FIGS. 16(a) and 16(b), it is demonstrated that the contrast is more improved in the structure with the two pairs of crossed Nicols than in the structure with the one pair of crossed Nicols.

Now, with reference to FIGS. 1 through 9, a liquid crystal display device to which the contrast improvement mechanism is applied is explained as below. The liquid crystal display device described below is arranged such that a first panel is a color panel including color layers and a second panel is a black and white panel including no color layer. However, the present invention is not necessarily limited to the arrangement.

Figure 1:
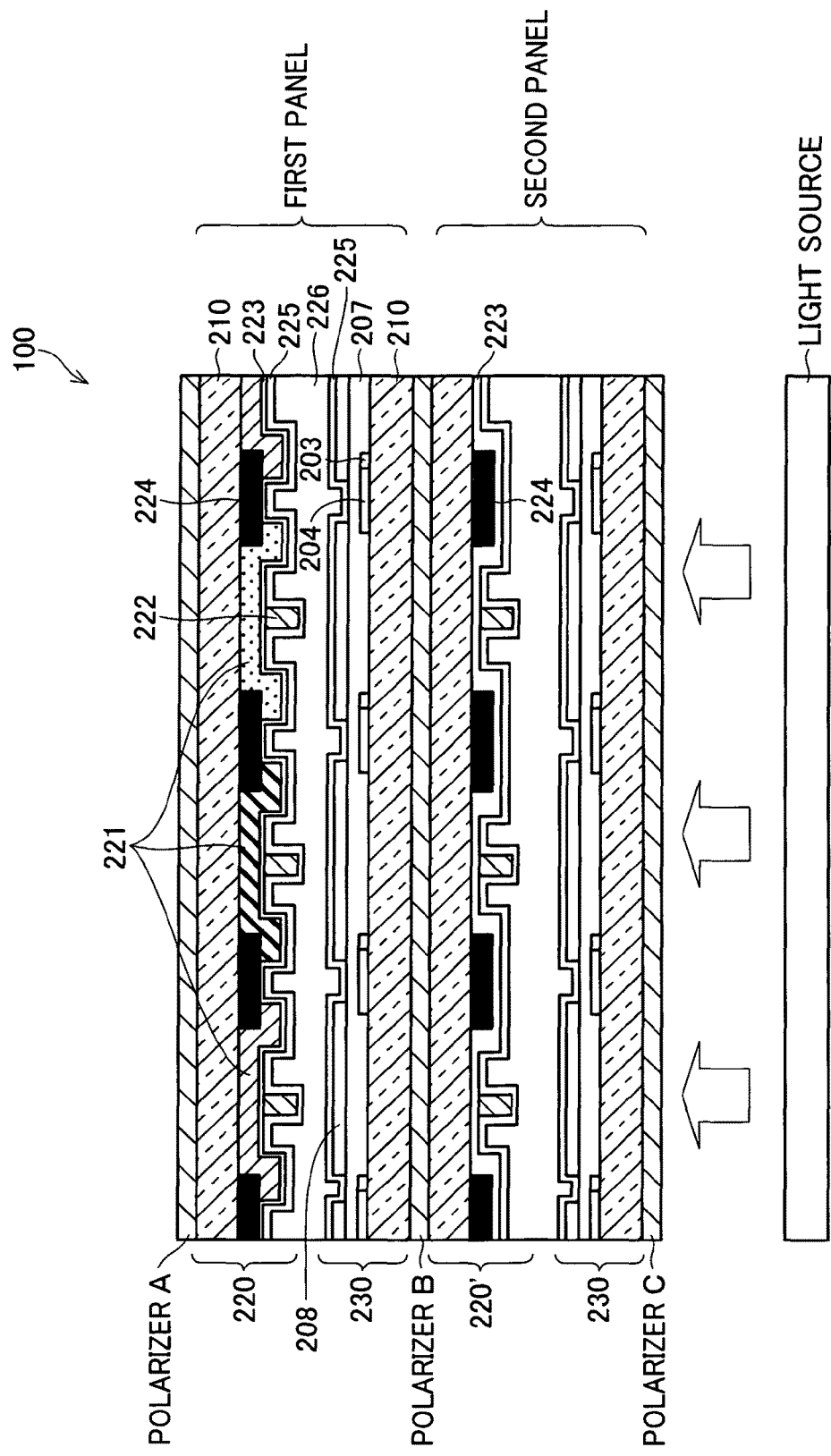
FIG. 1 is a diagrammatic cross-sectional view of a liquid crystal display device according to one embodiment of the present invention.

FIG. 1 is a cross-sectional view schematically illustrating a liquid crystal display device 100 according to the present embodiment.

As illustrated in FIG. 1, the liquid crystal display device 100 is arranged such that first and second panels and polarizers A, B, and C are alternately stacked on top of each other.

Figure 2:
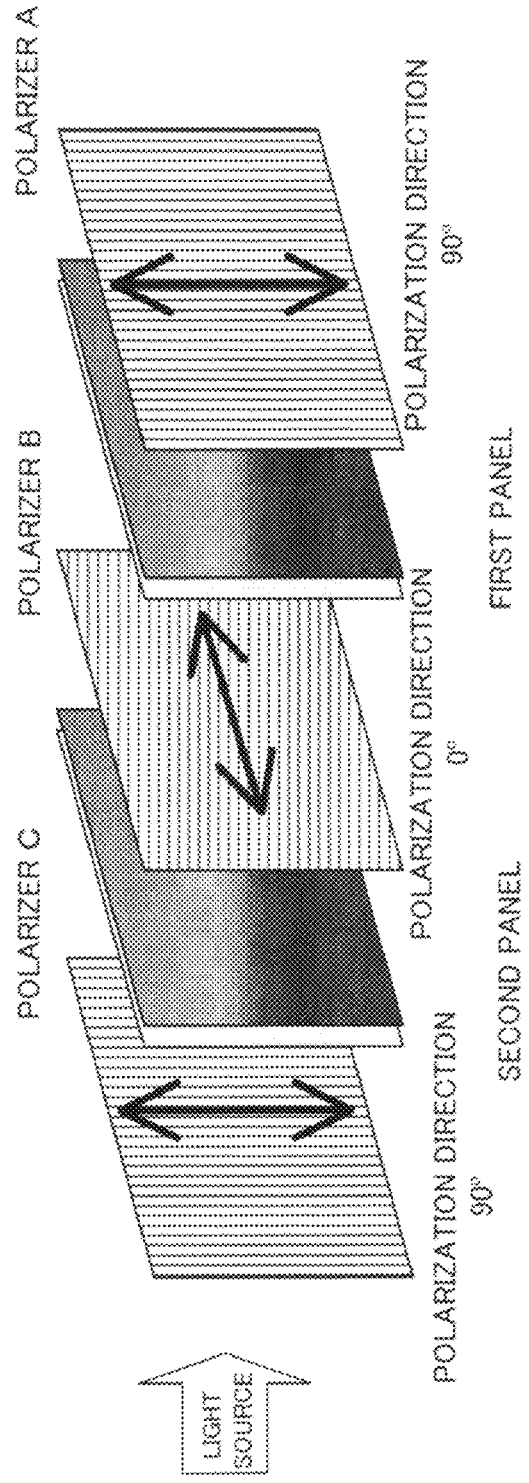
FIG. 2 illustrates a positioning of polarizers and panels in the liquid crystal display device of FIG. 1.

FIG. 2 illustrates a positioning of the polarizers and the liquid crystal panels in the liquid crystal display device 100 of FIG. 1. In FIG. 2, the polarizers A and B are arranged such that a polarization axis of the polarizer A is perpendicular to that of the polarizer B. The polarizers B and C are also arranged in the similar manner. That is, the polarizers A and B, and B and C are positioned so as to form crossed Nicols.

In the liquid crystal panels provided in the liquid crystal display device 100, a liquid crystal panel (first liquid crystal panel) provided in an uppermost surface (a side closest to a viewer) is a color liquid crystal panel, and a liquid crystal panel (second liquid crystal panel) provided on a backlight (light source) side is a black and white liquid crystal panel.

The first panel includes a pair of transparent substrates (a color filter substrate 220 and an active matrix substrate 230) with a liquid crystal being sealed therebetween. On the other hand, the second panel, which does not include a color filter, includes a counter substrate 220' and an active matrix substrate 230 with a liquid crystal being sealed therebetween. Each of the first and second panels includes means for switching, by electrically changing an alignment of the liquid crystal, a state of polarized light incident on the polarizer A from the light source to (i) a state where the polarized light is rotated by about 90°, (ii) a state where the polarized light is not rotated, or (iii) any intermediate states of the states (i) and (ii).

Further, each of the first and second panels has a function to display images with the use of a plurality of pixels. Examples of a displaying mode having such a function encompass a TN (Twisted Nematic) mode, a VA (Vertical Alignment) mode, an IPS (In Plain Switching) mode, a FFS mode (Fringe Field Switching) mode, and combinations of these modes. Among these modes, the VA mode is suitable because the VA mode exhibits high contrast without combining any other modes, and the description below is made with a MVA (Multidomain Vertical Alignment) mode. However, the IPS mode and the FFS mode also operate in a normally black mode and therefore are sufficiently effective. The liquid crystal is driven by active matrix driving with TFTs (Thin Film Transistors). Detailed descriptions of a manufacturing method of MVA are disclosed, for example, in Japanese Patent Application Publication, Tokukai, No. 2001-83523 A.

In the description, "vertical alignment" indicates a liquid crystal layer in which a liquid crystal molecule axis (also referred to as "axial direction") is aligned by about 85° or more angles with respect to a surface of a vertical alignment film.

The first and second panels in the liquid crystal display device 100 have the same structure except for the color filter. Each of the first and second panels includes, as has been already describe, a color filter substrate 220 (or a counter substrate 220') and an active matrix substrate 230 provided so as to face each other, and has a structure in which a specific distance between the substrates is maintained by use of spacers (not shown) such as plastic beads or resin columns provided on the color filter substrate 220 (or the counter substrate 220') and the like. A liquid crystal is sealed between the substrates provided in pairs (the color filter substrate 220 (or the counter substrate 220') and the active matrix substrate 230). A vertical alignment film 225 is formed on a surface of each of the substrates which surface comes into contact with the liquid crystal. The liquid crystal is a nematic liquid crystal having negative dielectric anisotropy.

The color filter substrate 220 includes a transparent substrate 210 including a color filter 221, a black matrix 224, and other components provided on the transparent substrate 210.

Figure 3:
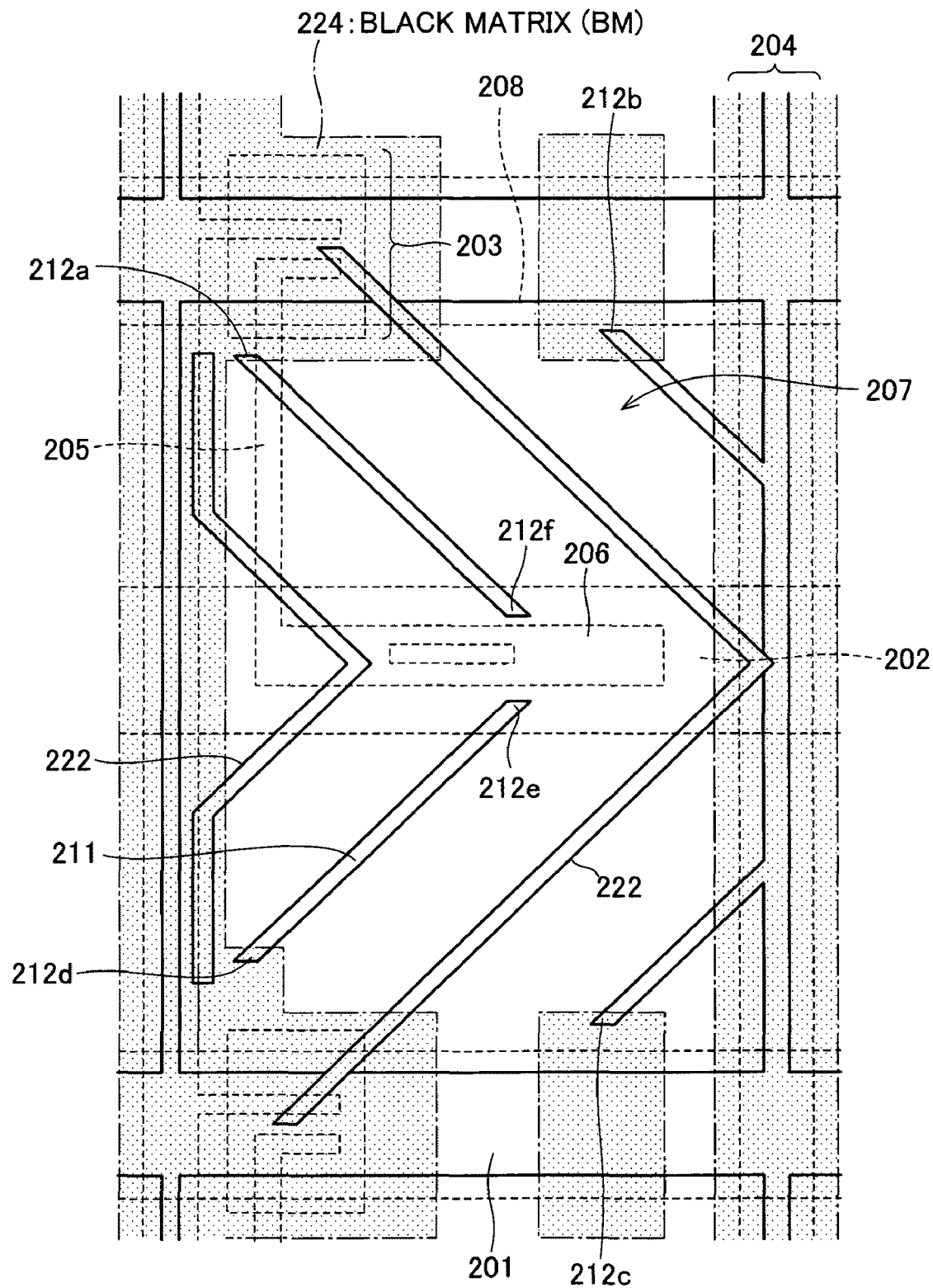
FIG. 3 is a plane view of the vicinity of a pixel electrode of the liquid crystal display device of FIG. 1.

The active matrix substrate 230 includes, as illustrated in FIG. 3, a transparent substrate 210 with TFT elements 203, pixel electrodes 208, and other components provided on the transparent substrate 210. The substrate 230 further includes projections 222 and slit patterns 211 each for controlling the alignment direction of the liquid crystal. When a threshold or greater voltage is applied to the pixel electrodes 208, liquid crystal molecules tilt in a perpendicular direction to the projections 222 and the slit patterns 211. In the present embodiment, the projections 222 and the slit patterns 211 are provided so that the liquid crystal aligns at an azimuth of 45° with respect to the polarization axis of the polarizer.

The counter substrate 220' constituting the second liquid crystal panel includes a transparent substrate 210 with counter electrodes 223, a black matrix 224, and other components provided on the transparent substrate 210.

The black matrixes of the first and second panels are arranged so as to face one another, when being viewed in a vertical direction.

As such, the liquid crystal display device of the present embodiment includes two liquid crystal panels provided so as to face each other, in which a liquid crystal panel (first liquid crystal panel) positioned in an uppermost surface is a color liquid crystal panel, and a liquid crystal panel (second liquid crystal panel) positioned on a backside of the first liquid crystal panel is a black and white liquid crystal panel. With the arrangement in which the second liquid crystal panel is a black and white liquid crystal panel, it is possible to simplify materials and processes. Further, in a case where two liquid crystal display panels are provided as color liquid crystal panels, parallax of the first and second panels, or displacement of color filters in the first and second panels may cause problems that a color display is not rightly carried out and moire occurs. In this regard, the arrangement of the present embodiment in which the first panel is a color liquid crystal panel and the second panel is a black and white liquid crystal panel can prevent such the problems that a color display is not rightly carried out and moire occurs.

Figure 4:
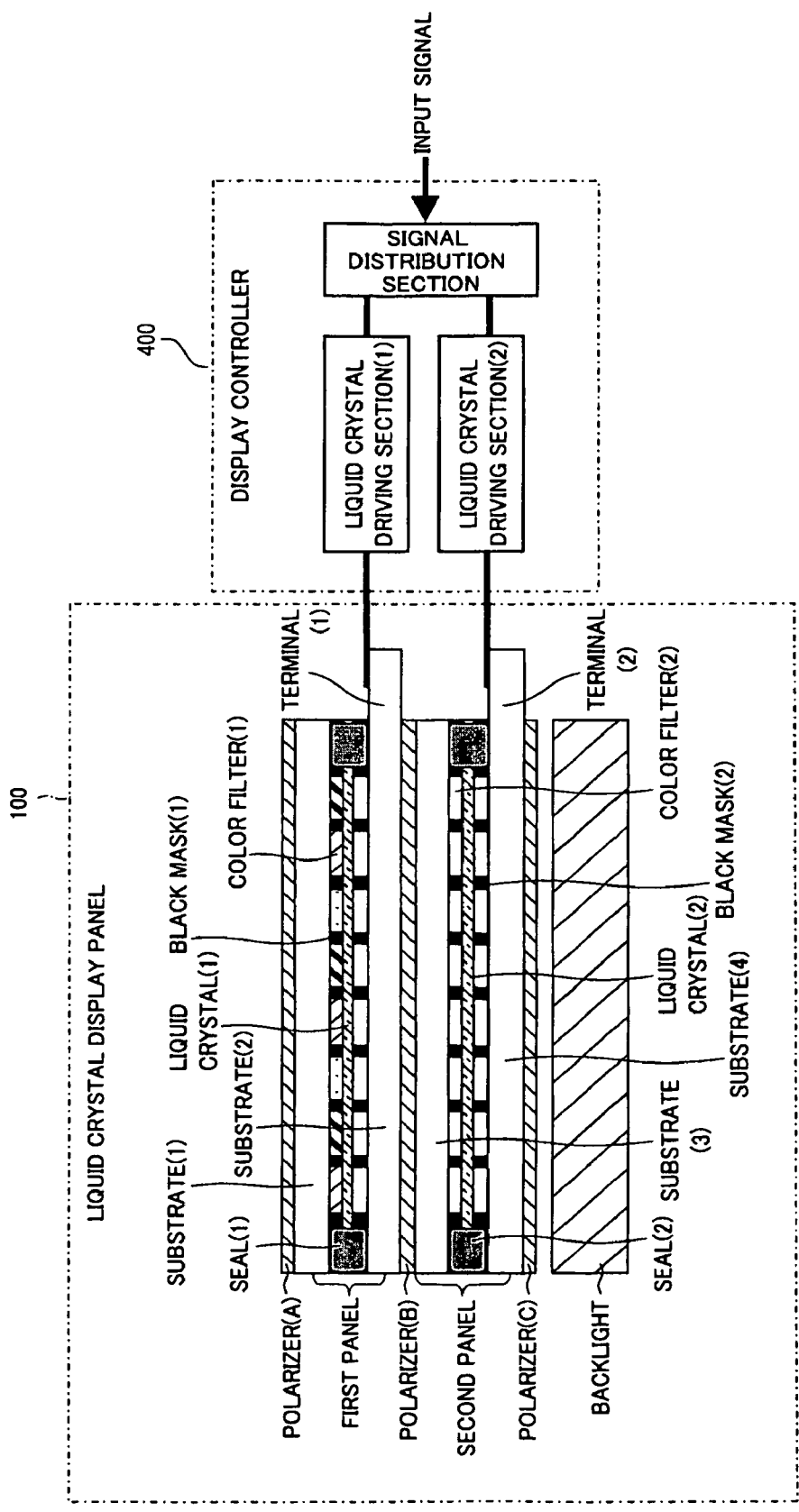
FIG. 4 schematically illustrates an arrangement of a drive system for driving the liquid crystal display device of FIG. 1.

FIG. 4 schematically illustrates a drive system for the liquid crystal display device 100 having the aforementioned arrangement.

The drive system includes a display controller 400 necessary for displaying a video image on the liquid crystal display device 100. As a result of this, appropriate image data based on an input signal is supplied to the liquid crystal display device 100.

The display controller 400 includes first and second panel drive circuits (1) and (2) which drive the first and second panels respectively with predetermined signals. The display controller 400 also includes a signal distribution section 401 which distributes video source signals to liquid crystal display drive section (1) and (2) (the first and second panel drive circuits (1) and (2)). Details of the display controller 400 will be described later.

The video source refers not only video signals supplied from a TV receiver, a VTR, a DVD and the like, but signals produced by processing these video signals.

From this reason, the display controller is to supply signals to each panel so that the liquid crystal display device 100 can display appropriate images.

The display controller sends suitable electric signals to the panels according to received video signals, and is constituted by drivers, circuit boards, panel drive circuits (driving circuits), and other components.

Figure 5:
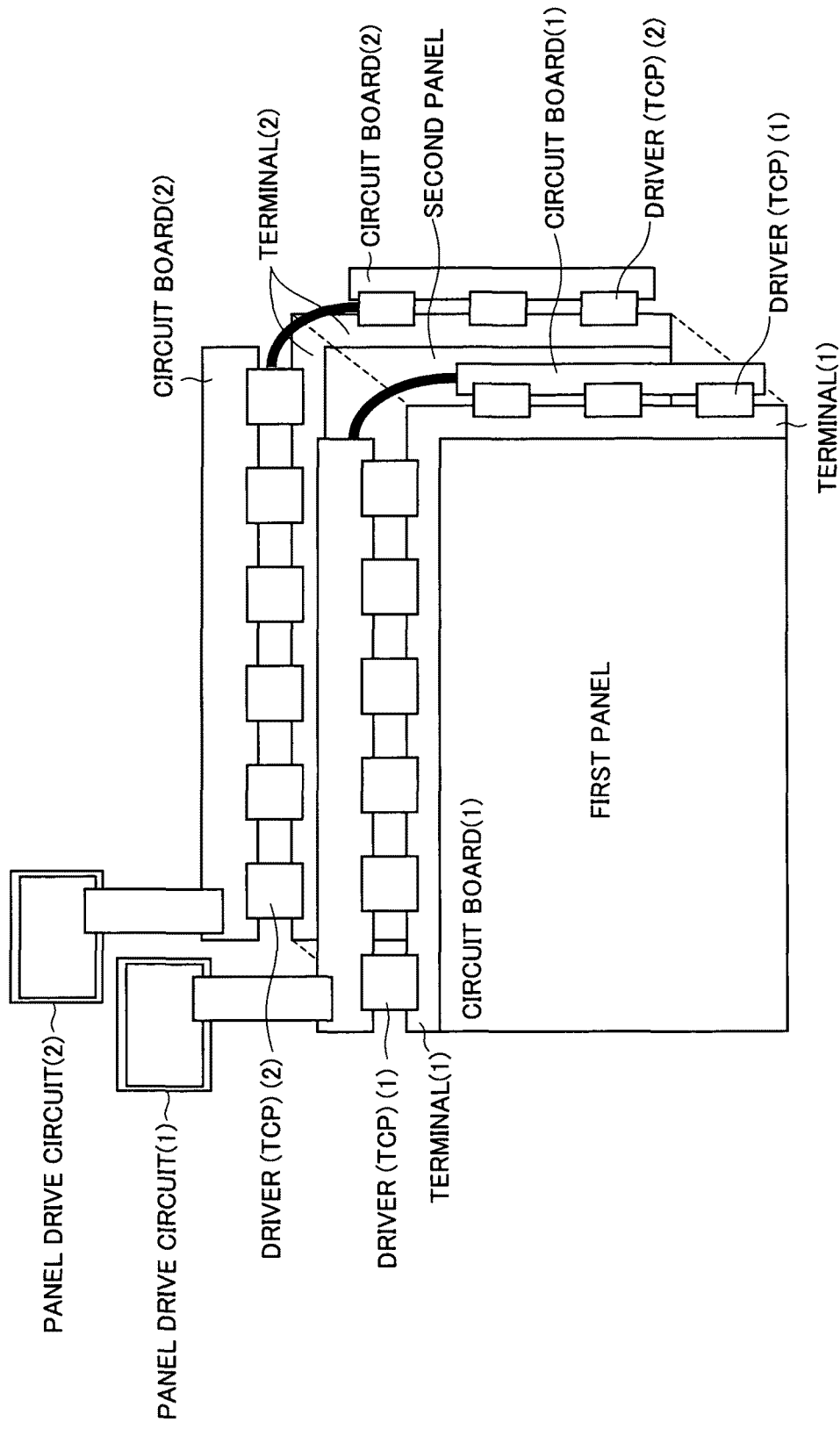
FIG. 5 illustrates connections between drivers and panel drive circuits in the liquid crystal display device of FIG. 1.

FIG. 5 illustrates connections between the first and second panels and the respective panel drive circuits. In FIG. 5, the polarizers are omitted.

The first panel drive circuit (1) is connected via a driver (TCP) (1) to terminals (1) provided on the circuit board (1) of the first panel. In other words, the driver (TCP) (1) is connected to the first panel, coupled by the circuit board (1), and connected to the panel drive circuit (1).

The second panel is connected to the second panel drive circuit (2) in the similar manner to the first panel, and therefore no further description is given.

The following deals with an operation of the liquid crystal display device 100 of the above configuration.

Pixels in the first panel are driven according to display signals, and pixels in the second panel, which pixels corresponds to the pixels in the first panel in a vertical direction to the panels, are driven in association with the first panel. When a part (construction 1) constituted by the polarizer A, the first panel, and the polarizer B transmits light, so does a part (construction 2) constituted by the polarizer B, the second panel, and the polarizer C transmits light; when the construction 1 does not transmit light, nor does the construction 2.

The first and second panels may be fed with identical image signals, or signals that are associated but different.

Next will be described a manufacturing method for the active matrix substrate 230 and the color filter substrate 220.

A manufacturing method for the active matrix substrate will be first described.

Firstly, a metal film such as a Ti/Al/Ti laminated film is formed, by sputtering, on the transparent substrate 210 so as to form scan signal lines (gate wirings/gate wires, or gate bus lines) 201 and auxiliary capacitance lines 202 as illustrated in FIG. 3. Then, a resist pattern is formed on the film by a photolithography method, and dry-etched by use of an etching gas (e.g. chlorine-based gas) to remove the resist. As such, the scan signal lines 201 and the auxiliary capacitance lines 202 are simultaneously formed on the transparent substrate 210.

Thereafter, a gate insulating film (made from silicon nitride (SiNx) and the like), an active semiconductor layer (made from amorphous silicon and the like), and a low-resistance semiconductor layer (made from amorphous silicon doped with phosphor and the like) are formed by CVD. Then, a metal film made from Al/Ti and the like is formed by sputtering so as to form data signal lines (source wirings/source wires, or source bus lines) 204, drain lead-out lines 205, and auxiliary capacitor forming electrodes 206. A resist pattern is formed by the photolithography method and dry-etched in an etching gas (e.g. chlorine-based gas) to remove the resist. As such, the data signal lines 204, the drain lead-out lines 205, the auxiliary capacitor forming electrodes 206 are simultaneously formed.

An auxiliary capacitor is formed such that a gate insulating film having a thickness of about 4000 Å is sandwiched between an auxiliary capacitance line 202 and an auxiliary capacitor forming electrode 206.

Then, the low-resistance semiconductor layer is dry-etched in a chlorine-based gas or the like for separating the sources from the drains so as to form TFT elements 203.

After that, an interlayer insulating film 7 made from an acrylic photosensitive resin and the like is applied by spin coating. Contact holes (not shown) for electrically connecting the drain lead-out lines 205 to pixel electrodes 208 are formed by the photolithography method. The interlayer insulating film 207 is formed to have a thickness of about 3 μm.

Then, pixel electrodes 208 and a vertical alignment film (not shown) are formed in this order.

The present embodiment, as described above, deals with an MVA liquid crystal display device, in which slit patterns 211 are provided in the pixel electrodes 208 made from ITO and the like. More specifically, a film is formed by sputtering, followed by a resist pattern being formed by the photolithography method. Then, etching is carried out in an etching solution (e.g. iron chloride) to form pixel electrode patterns as illustrated in FIG. 3.

The active matrix substrate 230 is thus obtained.

The reference signs 212a, 212b, 212c, 212d, 212e, and 212f in FIG. 3 indicates slits formed in the pixel electrode 208. In electrical connection parts of the slits, alignment is disturbed, which causes alignment anomaly. Besides, in addition to the alignment anomaly, a negative voltage is applied to the slits 212a to 212d most of the time. This is because a positive voltage is applied to the gate wiring to turn on the TFT element 203 generally for periods on the order of microseconds, whereas the negative voltage is applied to the gate wiring to turn off the TFT element 203 for periods on the order of milliseconds. For this reason, if the slits 212a to 212d are positioned on the gate wirings, ionic impurities contained in the liquid crystal concentrate due to a gate negative DC application component. This may be viewed as display non-uniformities. The slits 212a to 212d, therefore, should be disposed so that they do not overlap the gate wirings in a plane manner. On this account, as illustrated in FIG. 3, it is desirable that the slits be covered with the black matrix 224.

Next will be described a manufacturing method for the color-filter substrate 220.

The color filter substrate 220 includes, on the transparent substrate 210, a color filter layer constituted by color filters 221 for three primary colors (Red, Green, Blue) and a black matrix (BM) 224, a counter electrode 223, a vertical alignment film 225, and alignment control projections 225.

Firstly, a negative acrylic photosensitive resin solution in which carbon fine particles are dispersed is applied by spin coating onto the transparent substrate 210, and then dried to form a black photosensitive resin layer. Subsequently, the black photosensitive resin layer is exposed to light using a photo mask, and developed so as to form the black matrix (BM) 224. The BM is formed so as to have respective openings for a first color layer (for example, a red layer), a second color layer (for example, a green layer), and a third color layer (for example, a blue layer) in areas where the first, second, and third layers will be provided (the openings are provided to respectively correspond to the pixel electrodes). More specifically, as illustrated in FIG. 3, a BM pattern is formed in an island shape so as to shield, from light, alignment anomaly regions occurring in the electric connection parts of the slits 212a to 212d in the slits 212a to 212f in the pixel electrode 208. Then, a light blocking section (BM) is formed on the TFT element 203 so as to prevent an increase in leak current photoexited by external light incident on the TFT element 203.

After that, a negative acrylic photosensitive resin solution in which a pigment is dispersed is applied by spin coating. The solution is dried, exposed to light using a photo mask, and developed so as to form a red layer.

Then, the second color layer (for example, a green layer,) and the third color layer (for example, a blue layer) are formed in the same manner. Thus the color filters 221 are formed.

Moreover, the counter electrode 223 is formed of a transparent electrode, such as ITO, by sputtering. A positive phenolnovolak photosensitive resin solution is applied thereon by spin coating. The solution is dried, exposed to light using a photo mask, and then developed so as to form the vertical alignment controlling projections 222.

In this way, the color filter substrate 220 is formed.

The present embodiment deals with a BM made from resin. However, the BM may be made from metal. Further, the three primary colors for the color layers are not limited to red, green, and blue; the color layers may be cyan, magenta, yellow, and the like, and there may be also provided a white layer.

The counter substrate 220' constituting the second panel does not include a color filter 221 as provided in the color filter substrate 220, and can be manufactured according to the same processes except for the process to form the color filter as the aforementioned method for manufacturing the color filter substrate 220. Further, the counter substrate 220' may be manufactured by a general manufacturing method for a counter substrate of a liquid crystal panel for a black and white display.

The following describes a manufacturing method for a liquid crystal panel (the first and second panels) with the use of the color filter substrate 220 and the active matrix substrate 230 manufactured as above.

First, a vertical alignment film 225 is formed on a surface of each of the color filter substrate 220 and the active matrix substrate 230 which surface comes into contact with a liquid crystal. More specifically, before the alignment film is formed, the substrate is baked for degassing, and washed. Then, the alignment film is applied thereon and baked. After that, the substrate is washed and baked for degassing. The vertical alignment film 225 establishes an alignment direction of the liquid crystal 226.

Next will be described a method for sealing a liquid crystal between the active matrix substrate 203 and the color filter 220.

The method for sealing a liquid crystal may be, for example, a vacuum injection method in which (i) a thermosetting sealing resin is provided around the substrates in such a manner that an injection hole for injecting a liquid crystal in the substrates is formed in the thermosetting sealing resin, (ii) the injection hole is immersed in a liquid crystal in vacuum, (iii) the injection hole is then open up to the atmosphere so that the liquid crystal is injected, and (iv) the injection hole is sealed with a UV curing resin or the like. However, when a vertical alignment liquid crystal panel is manufactured by the vacuum injection method, it takes very long time to inject the liquid crystal, compared with a horizontal alignment panel. From this reason, the present embodiment employs a one drop filling process.

A UV curing sealing resin is applied to a periphery of the active matrix substrate, and the liquid crystal is dropped onto the color filter substrate by a dropping method. An optimal amount of liquid crystal is regularly dropped, by the one drop filling process, inside the sealing so that the liquid crystal establishes an intended cell gap.

Moreover, in order that the color filter substrate which has the sealing applied thereon and the active matrix substrate which has the liquid crystal dropped thereon are joined with each other, an atmospheric pressure inside a joining device is reduced to 1 Pa. After the substrates are joined with each other under the reduced pressure, the pressure is changed back to the atmospheric pressure so that the sealing part is collapsed. As such, a desired gap is obtained in the sealing part.

Then, the resultant structure with the desired cell gap in the sealing part is irradiated with UV radiation in a UV curing device so that the sealing resin is preliminarily cured. Further, the resultant structure is baked so that the sealing resin is completely cured. At this stage, the liquid crystal moves over inside the sealing resin, filling up the cell. After the baking, the structure is separated into individual liquid crystal panels. That completes the manufacture of the liquid crystal panel.

Next will be described an assembling method of the first and second panels manufactured by the aforementioned method.

After the first and second panels are washed, a polarizer is attached to each of the panels. More specifically, polarizers A and B are respectively attached to a front surface and a back surface of the first panel, as illustrated in FIG. 4. Further, a polarizer C is attached to a back surface of the second panel. The polarizers may be laminated with an optical compensation sheet and the like, if necessary.

Then, drivers (liquid crystal driver LSIs) are connected. Here, the drivers are connected by a TCP (Tape Career Package) method.

For example, as illustrated in FIG. 5, an ACF (Anisotropic Conductive Film) is preliminarily attached by pressure to terminal sections (1) of the first panel. Then, TCPs (1) having drivers thereon are punched out from a career tape and aligned with respect to panel terminal electrodes. After that, the TCPs are heated so as to be completely attached. Then, circuit boards (1) for coupling the driver TCPs (1) with each other are connected to input terminals (1) of the TCPs (1) via the ACF.

After that, the two panels are attached to each other. The polarizer B includes adhesive layers on both surfaces. A surface of the second panel is washed, and laminates of the adhesive layers of the polarizer B attached to the first panel is peeled off. After being precisely aligned, the first and second panels are attached to each other. Bubbles may come into an interface between the panels and the adhesive layers in the attaching process; it is preferable that the panels be attached in vacuum.

Alternatively, the panels may be attached by another method as follows. An adhesive agent (e.g. epoxy adhesive agent) that is cured at a room temperature or a temperature equal to or below an allowable temperature limit of the panels is applied to a periphery of the panels. Plastic spacers are splayed thereto, and fluorine oil is sealed. Preferred materials are optically-isotropic liquids having a refractive index close to that of the glass substrate, and being as stable as liquid crystal.

The present embodiment is applicable to cases where the terminal faces of the first and second panels are at the same position, as illustrated in FIGS. 4 and 5. Further, the direction of the terminals with respect to the panels and the method for attaching the panels are not especially limited. For example, the panels may be mechanically fixed without using an adhesive.

After the panels are assembled, the panels are integrated with an illumination device called backlight so as to form a liquid crystal display device 100.

The following deals with a concrete example of an illumination device preferably applicable to the present invention. Note however that an illumination device used in the present invention is not limited to the illumination device discussed below, and may be appropriately altered.

Figure 6:
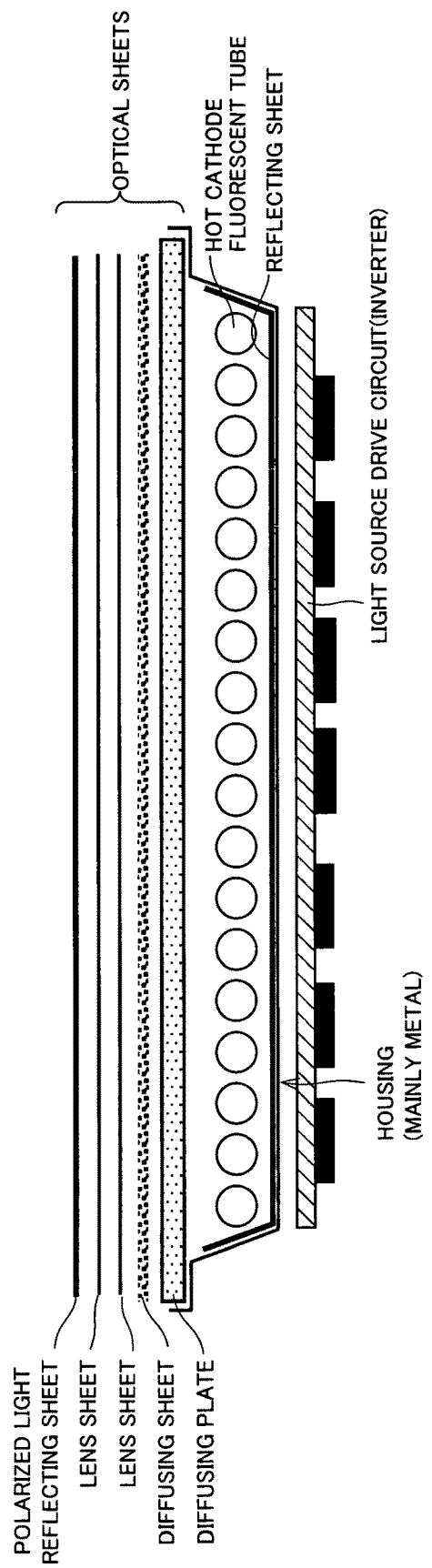
FIG. 6 schematically illustrates an arrangement of a backlight included in the liquid crystal display device of FIG. 1.

The liquid crystal display device 100 of the present invention, due to its display mechanism, needs a backlight that can generate greater amount of light than conventional panels can. In addition, absorption of short wavelengths in a wavelength region becomes more significant in the present invention than the conventional panels. Therefore, it is necessary that a blue light source having shorter wavelength be used in the illumination device. An example of the illumination device satisfying these conditions is illustrated in FIG. 6.

The liquid crystal display device 100 of the present invention employs hot cathode fluorescent lamps to have luminance similar to those of conventional liquid crystal display devices. The hot cathode fluorescent lamp can generate about six times greater amount of light than that of a cold cathode fluorescent lamp used in general specifications.

One example of standard liquid crystal display devices is a 37-inch WXGA display in which 18 lamps each having an outer diameter ($\phi$) of 15 mm are arranged on a housing made from aluminum. The housing is provided with a white reflecting sheet made from resin foam for efficient usage of light emitted backward from the lamps. A power supply for the lamps is provided on a back of the housing, and drives the lamps on a household power supply.

A direct backlight in which a plurality of the lamps are arranged on the housing needs a translucent white resin plate to eliminate images of the lamps. A 2-mm thick plate member made from polycarbonate is provided on the housing above the lamps. The polycarbonate exhibits high resistance to wet warping and heat deformation. Further, in order to obtain predetermined optical effects, optical sheets, specifically, a diffusing sheet, a lens sheet, another lens sheet, and a polarized light reflecting sheet are provided on top of the plate member from the bottom. The specification enables the backlight to have about 10 times brighter backlight luminance than conventional specifications in which 18 of cold cathode fluorescent lamps each having an outer diameter (φ) of 4 mm, two diffusing sheets, and a polarized light reflecting sheet are provided. This allows the 37-inch liquid crystal display device of the present invention to have luminance of approximately 400 cd/m$^2$.

The backlight of the present invention generates as much as 5 times more heat than a conventional backlight. Therefore, a fin to promote heat dissipation to the air and a fan to create airflow to forcefully eject the heat through the airflow are provided on a back of a back chassis.

Mechanical members of the illumination device also function as main mechanical members for a whole liquid crystal module. The assembled panels are provided to the backlight. A liquid crystal display controller including panel drive circuits and a signal distributor, a light source power supply, and in some cases a general household power supply are also attached thereto. As such, a liquid crystal module is completed. The assembled panels are attached to the backlight, and a framework is disposed to hold the panels. As such, the liquid crystal display device of the present invention is completed.

The present embodiment deals with a direct illumination device using hot cathode fluorescent tubes. However, a projection type or edge light illumination device may be also used depending on purposes. Further, the light source may be cold cathode fluorescent tubes, LEDs, OELs, or electron beam fluorescence tubes. Any optical sheets may be selected for a suitable combination.

In the above embodiment, as a method for controlling an alignment direction of vertical alignment liquid crystal molecules, the slits are provided in the pixel electrodes of the active matrix substrate and the alignment controlling projections are provided in the color filter substrate. However, as a modified embodiment, the slits and the projections may be transposed. Furthermore, slits may be provided in electrodes of both substrates, or an MVA liquid crystal panel may be arranged such that alignment control projections are provided on surfaces of electrodes of both substrates.

Figure 17:
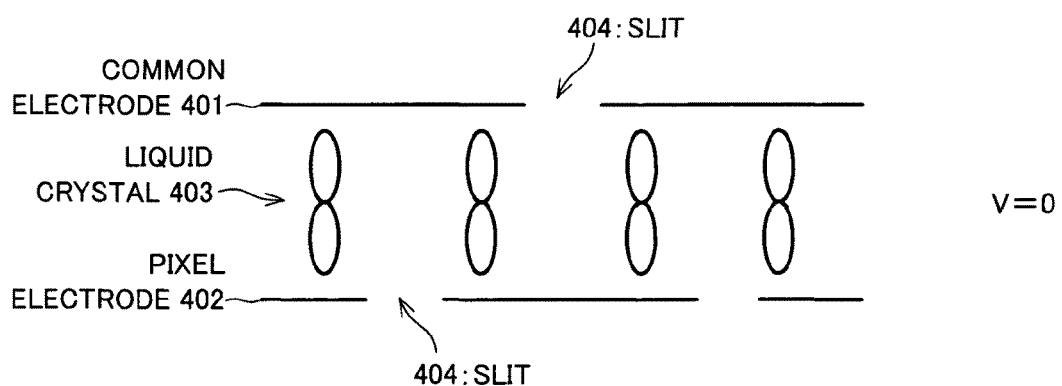
FIG. 17($a$) is a cross-sectional view illustrating a structure of a liquid crystal display device in a PVA mode, to which no voltage is being applied.
Figure 17:
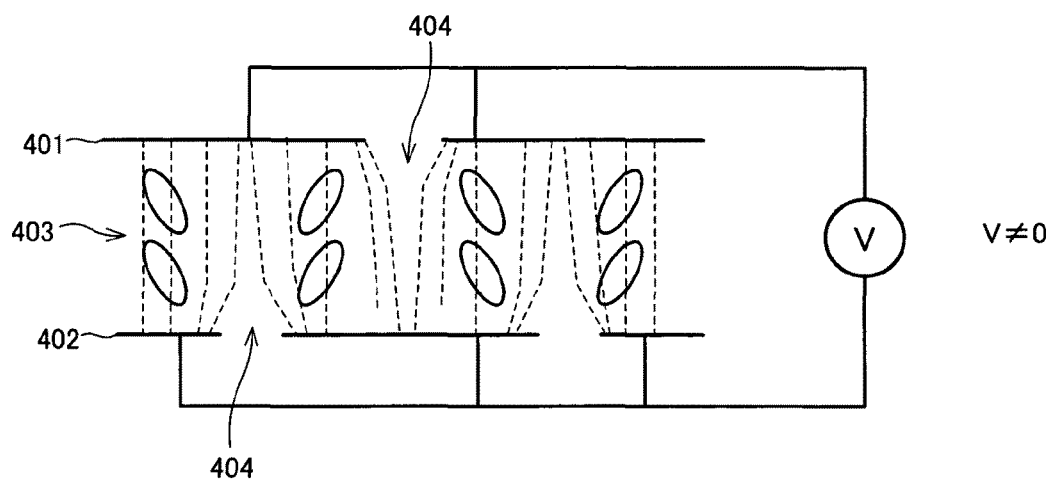

FIGS. 17(a) and 17(b) are cross-sectional views each schematically illustrating a structure in which electrodes (a common electrode 401 and a pixel electrode 402) of both substrates have slits 404, i.e., a PVA (Patterned Vertical Alignment) mode. An alignment film is a vertical alignment film, and a liquid crystal 403 is a liquid crystal having negative dielectric anisotropy. FIG. 17(a) is a state where no voltage is applied; a liquid crystal is standing upright. FIG. 17(b) is a state where a voltage is applied; a tilt direction of the liquid crystal is specified through an oblique electric field produced by the slits in the electrodes. The same polarizer angles as those in the MVA mode can be used in the PVA mode.

Besides the MVA mode, a method using a pair of vertical alignment films that establish vertical pre-tilt directions (alignment treatment direction) may be also used. Moreover, a VA mode may be also used in which liquid crystal molecules are twist-aligned. This mode is also referred to as a VATN (Vertical Alignment Twisted Nematic) mode. The VATN mode is more preferable in the present invention because no decrease in contrast occurs due to light leaking through alignment controlling projections. The pre-tilt is established by optical alignment or the like.

Figure 7:
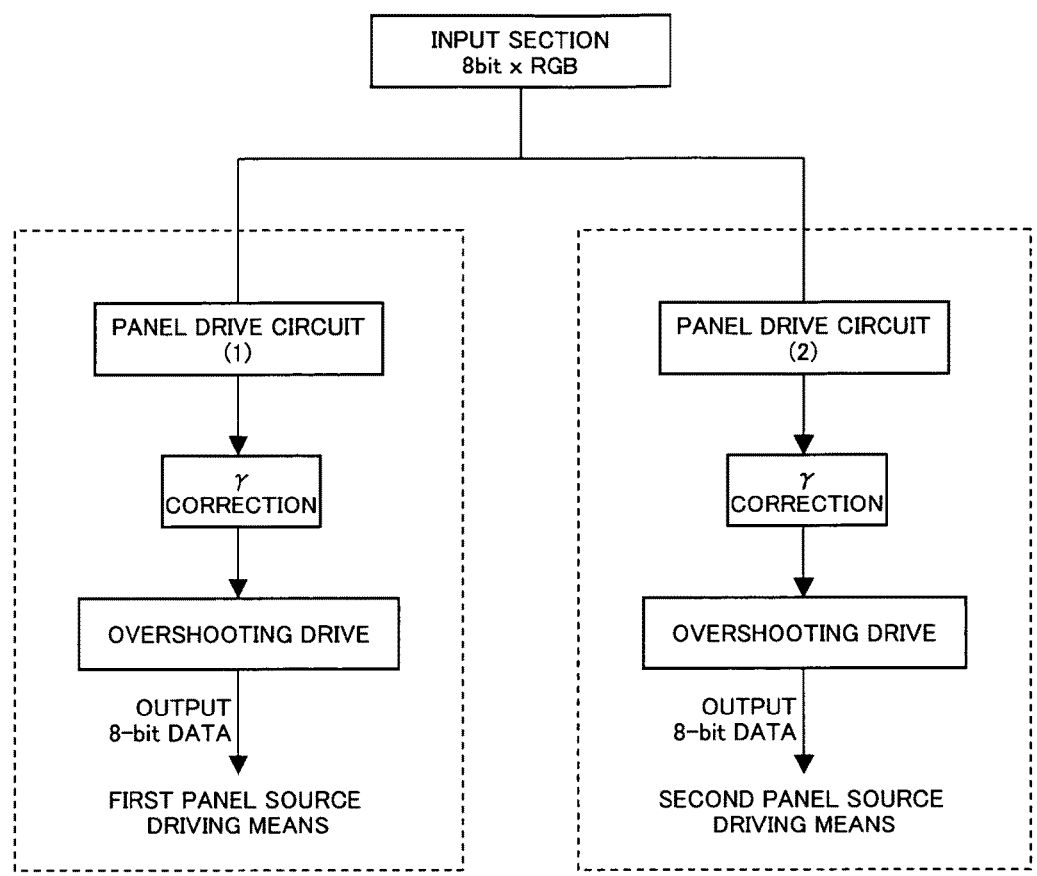
FIG. 7 is a block diagram of a display controller, which is a driving circuit to drive the liquid crystal display device of FIG. 1.

The following deals with a concrete example of a driving method in the display controller of the liquid crystal display device 100 arranged as above, with reference to FIG. 7. Assume 8-bit (256 gradation) inputs and 8-bit liquid crystal drivers.

The panel driver circuit (1) of the display controller section carries out drive signal processing such as γ-correction and overshooting with respect to an input signal (video source) so as to output 8-bit gradation data to a source driver (source driving means) of the first panel.

Meanwhile, the panel drive circuit (2) carries out signal processing such as γ-correction and overshooting so as to output 8-bit gradation data to a source driver (source driving means) of the second panel.

The first and second panels handle 8-bit data, and the resultant outputs are also 8-bit images. Each of the output images corresponds to each of the input signals one to one, so that the input images are faithfully reproduced.

According to Patent Literature 7 (Japanese Patent Application Publication Tokukaihei No. 5-88197), when an image is outputted such that its gradation changes from a low to a high, the gradation on each panel does not necessarily increase continuously. For example, when the luminance increases from 0, 1, 2, 3, 4, 5, 6, . . . , the gradation on the first panel and the second panel (m, n) is such that (0, 0), (0, 1), (1, 0), (0, 2), (1, 1), (2, 0), . . . . Notation (m, n) indicates that the gradation on the first panel is m while the gradation on the second panel is n. Thus, the gradation on the first panel changes from 0 to 0, 1, 0, 1, 2, and the gradation on the second panel changes from 0 to 1, 0, 2, 1, 0. Neither of the gradations monotonically increases. However, since overshooting driving and other many signal processing for liquid crystal display devices use an algorithm which employs interpolation calculations, it is necessary that gradation monotonically increase (or decrease). In such a case where the gradation does not increase monotonically, all gradation data should be stored in memory. This requires a large-scale display control circuit and IC, which leads to an increase in cost.

Figure 18:
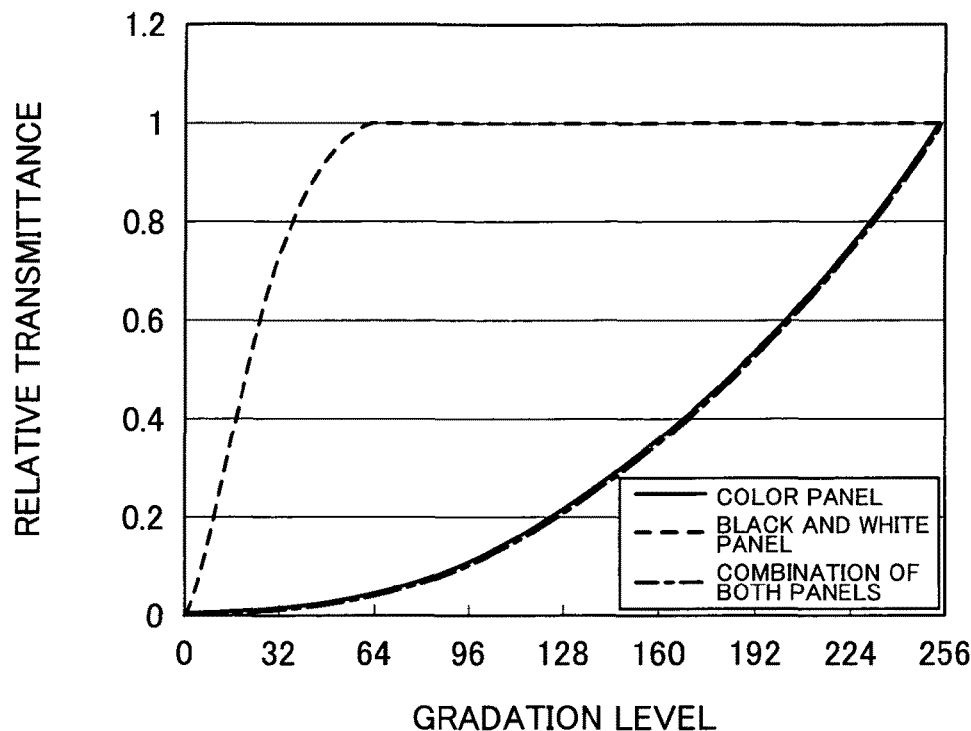
FIG. 18 is graphs representing plotted gradation characteristics of a color panel, a black and white panel, and a combination of both panels.
Figure 19:
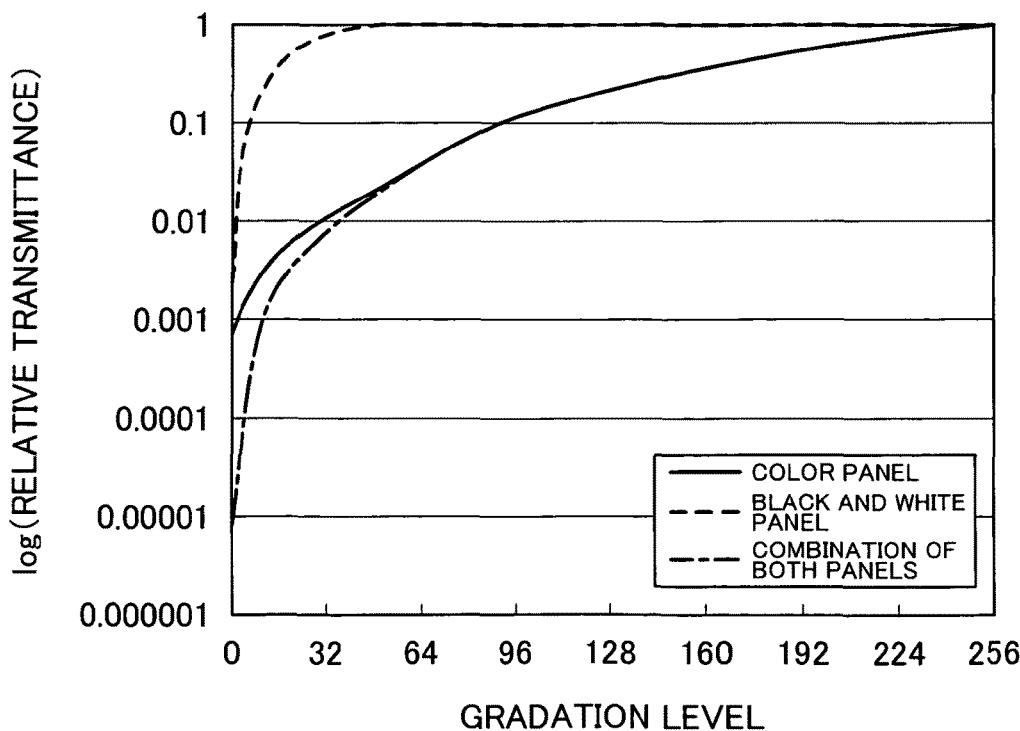
FIG. 19 is graphs representing the gradation characteristics of FIG. 18 that are plotted on a log scale.

In most cases, a gradation characteristic of a color panel is set γ=2.2. However, since contrast of a liquid crystal panel is limited, the gradation characteristic is not γ=2.2 in a low gradation region. For this reason, the gradation characteristic is adjusted such that γsmoothly decreases at a gradation level of not more than 64 so that no tone-jump occurs or the gradation is not saturated. A gradation characteristic of a black and white panel is adjusted so as to be γ=2.2 in a state where the color panel and the black and white panels are stacked with each other. FIG. 18 shows plotted gradation characteristics of (i) the color panel, (ii) the black and white panel, and (iii) the combination of both panels. FIG. 19 shows the gradation characteristics of FIG. 18 that are plotted on a log scale. FIG. 19 demonstrates that the combination of both panels can attain the gradation characteristic of γ=2.2 at almost all the gradation levels.

In a case where an image is displayed on the stacked first and second panels and the panels are viewed at oblique viewing angles, the image appears double due to parallax between the two panels. In order to avoid such a problem, at least either one of the panels outputs an image that has been subjected to a smoothing process. The smoothing process, which is particularly effective for an image having an edge, smoothes the image, so that the image hardly appears double. More effectively, it is necessary to carry out the smoothing process with respect to an image on the black and white panel (the second panel).

The following deals with a method for carrying out the smoothing process in the black and white panel of the liquid crystal display panel of the present invention.

Figure 21:
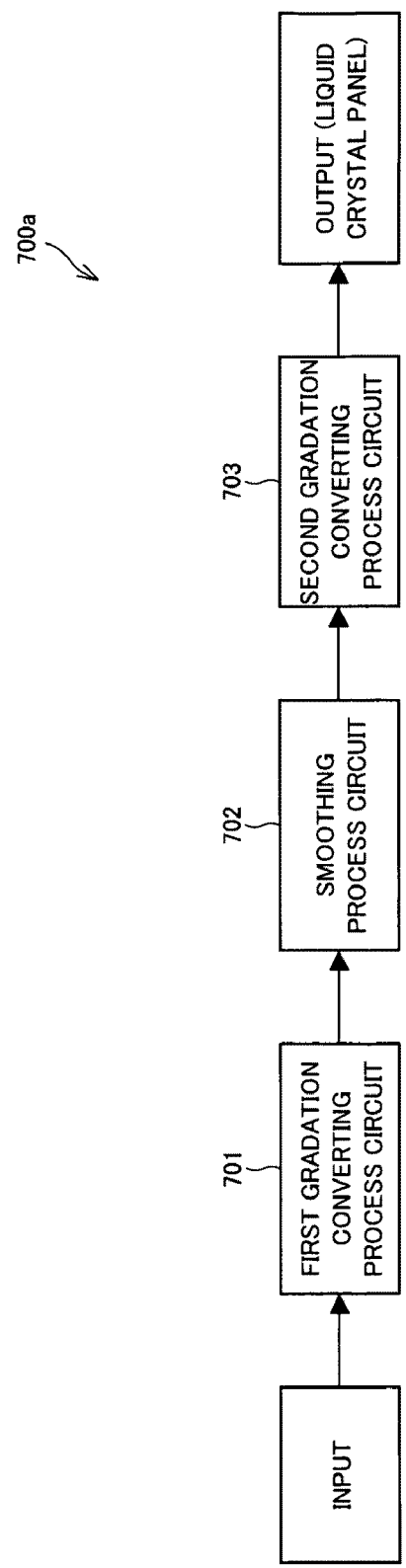
FIG. 21 is a block diagram illustrating an exemplary configuration of a driving circuit of a black and white panel of a liquid crystal display device according to an embodiment of the present invention.

FIG. 21 illustrates a configuration of a panel drive circuit (driving circuit) 700a that supplies image data to the black and white panel. As illustrated in FIG. 21, the panel drive circuit 700a includes a smoothing process circuit 702 that carries out a smoothing process with respect to an inputted video source signal. The panel drive circuit 700a further includes: (a) a first gradation converting process circuit 701 that carries out a first gradation converting process with respect to a first gradation level of the inputted video source signal that has not been subjected to the smoothing process; and (b) a second gradation converting process circuit 703 that carries out a second gradation converting process with respect to a second gradation level of the input video source signal that has been subjected to the smoothing process. In other words, a video source signal supplied to the panel drive circuit 700a is transmitted to the first gradation converting process circuit 701, the smoothing process circuit 702, and the second gradation converting process circuit 702 sequentially in this order. The signal is ultimately sent to the black and white panel (liquid crystal panel) as image data.

As such, the first gradation converting process circuit, the smoothing process circuit 702, and the second gradation converting process circuit are provided, in this order, between (i) an input section that supplies a video source signal to the panel drive circuit 700a and (ii) the liquid crystal panel to which the inputted video source signal is ultimately sent. In the present embodiment, the second gradation converting process circuit 703 is formed in a combination of a digital-γ correction circuit and a digital/analogue conversion circuit, which set a voltage to be applied to the liquid crystal, in the liquid crystal controller. Further, in the present embodiment, the first gradation converting process circuit 701 and the smoothing process circuit 702 are formed in an FPGA (ASIC) that is followed by the liquid crystal controller. However, all of these circuits may be formed in the liquid crystal display controller.

In the present embodiment, an 8-bit signal is employed for explanation of gradation of an input signal. The signal size may be larger or smaller than this.

An inputted video source signal is referred to as $X_1$. The input signal $X_1$ is generally supplied as a single digital signal that is a separated R, G, or B signal, in a case of a digital display device such as an LCD is used. A gradation level of an 8-bit signal is $0<X_1<255$. The input signal is supplied to the first gradation converting process circuit 701 in which the input signal is processed in accordance with a function expressed by $X_2=G_1(X_1)$, and then sent to the smoothing process circuit 702 in which the input signal is subjected to a smoothing process. A function used in the smoothing process is expressed by $X_3=S(X_2)$. The S(X) is a function based on image information. In connection with the first gradation converting process described in the present invention, simply assume a case where $X_3$ equals $X_2$. Then, the video source signal is sent to the second gradation converting process circuit 703 in which the signal is processed in accordance with $T=G_2(X_3)$. Thus processed signal is then outputted from the liquid crystal panel as a video signal (image data). The video source signal is converted into variation of the transmittance of the liquid crystal panel via a D/A converting process. From this reason, T is represented by a relative transmittance (maximum value: 1).

Further, a relationship between $G_1(X)$ and $G_2(X)$ satisfies $O(X_1)=G_2(G_1(X_1))$, where $X_1$ is the input signal and $O(X_1)$ is a function of a relationship between intended gradation of an image to be ultimately outputted from the liquid crystal panel and relative transmittance (luminance).

The function $O(X_1)$ of the relationship between intended gradation of an image to be ultimately outputted from the liquid crystal panel and relative transmittance is $X_1^{2.2}$ in a general display. A video image transmitted from a broadcasting station and the like has a γ characteristic of $X^{0.45}$, therefore $O(X_1)$ is $(X^{0.45})^{2.2}=X$. As such, the video image is linearly reproduced. Accordingly, the function $O(X_1)$ is $O(X_1)=C \cdot X_1^{2.2}$ (C is a proportional constant). However, the present invention is not limited to this.

A concrete value of C is determined, for example, as follows.

$O(X_1)$ is zero when $X_1$ is zero, and $O(X_1)$ is 1 when $X_1$ is 255. Accordingly, C is $1/255^{2.2}$.

The following explains more particularly about the signal processing method in the panel drive circuit 700a.

An input signal (video source signal) $X_1$ is γ-corrected (=a gradation correction; a first gradation converting step. The γ-correction is carried out in the first gradation converting process circuit 701. The γ-correction will be described later.

Figure 20:
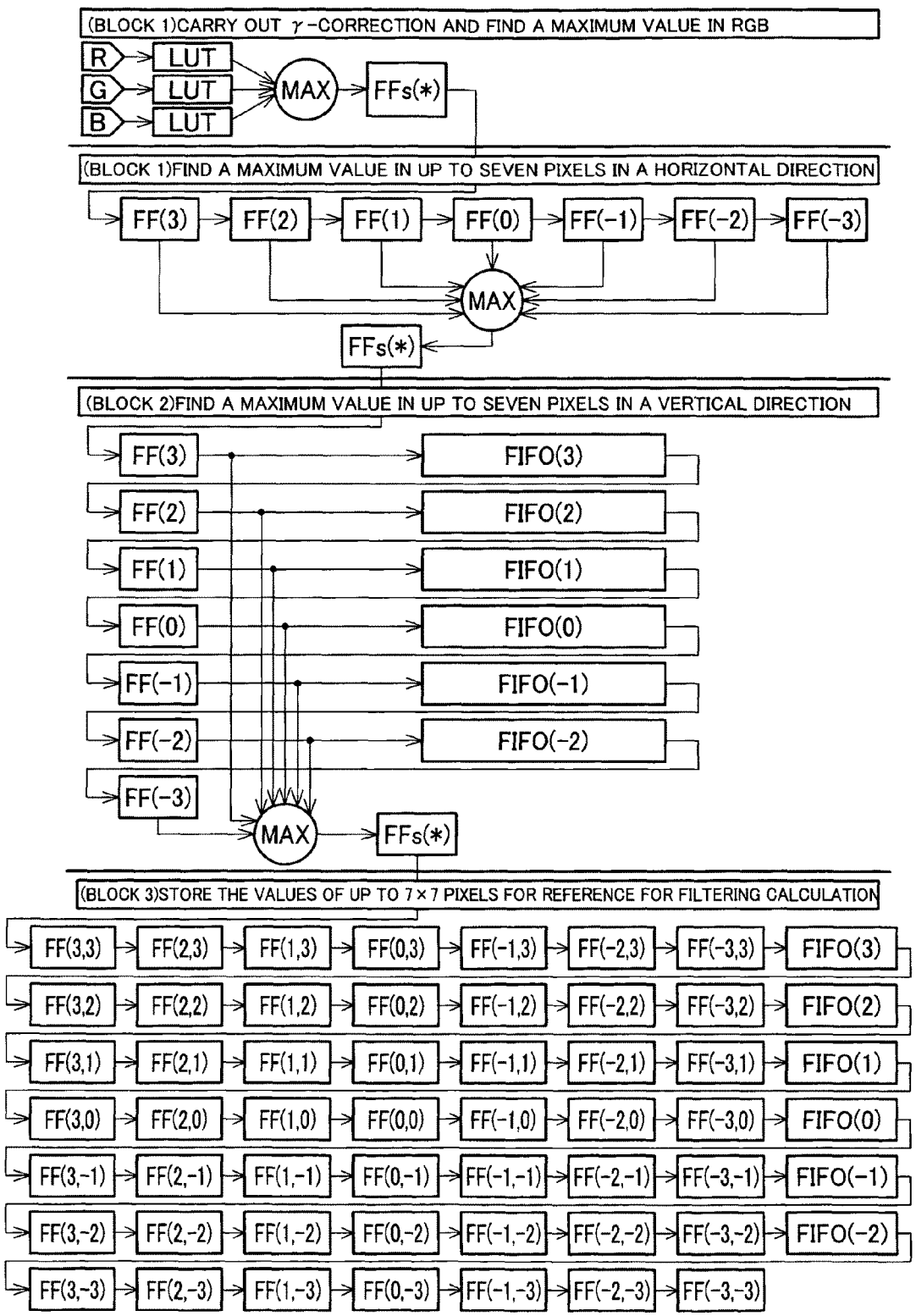
FIG. 20 is a diagram illustrating a data line flow of a black and white panel in a liquid crystal display device according to an embodiment of the present invention.

Then, thus γ-corrected video source signal $X_2$ is transmitted to the smoothing process circuit 702. The signal is subjected to a smoothing process as follows. FIG. 20 is a diagram illustrating a data line flow of the smoothing process carried out in the black and white panel. The following description will be made, referring to the data line flow.

First, a maximum value is calculated from data respectively for RGB.

Then, the smoothing process is carried out (a smoothing process step). The size of the smoothing process is determined in advance considering parallax of the panels when viewed at an oblique angle. $D_p$ (the subscript "p" is an abbreviation of "parallax") is given by the following equation:

$$D_p = D_{gap} \times \tan(\sin^{-1}(1/n) \times \sin(\theta))$$

where θ is an oblique angle, $D_{gap}$ is a distance between liquid crystal layers of the color liquid crystal panel and the black and white liquid crystal panel, and n is an average refractive index of materials provided between the liquid crystal layers of the color liquid crystal panel and the black and white liquid crystal panel. A maximum value of θ is 90°. In a practical viewpoint, it is preferable to prevent an image from appearing double due to the parallax at oblique angles between 45° and 60°. For this reason, $D_p$ is determined such that θ is preferably not less than 45°, more preferably not less than 60°. The actual smoothing distances $D_N$ and $D_M$ are determined so as to be a value close to $D_p$ calculated from the equation.

In the present embodiment, $D_{gap}$ is about 1.8 mm, and the refractive index n between the liquid crystal layers is 1.4. Accordingly, $D_p$ is 0.9 mm at a practically necessary angle of 45° and 1.4 mm at a practically necessary angle of 60° for one side of the panel. Further, a pixel size is about 0.43 mm for a 37-inch full HD (resolution: 192×1080) used of the present embodiment. Herein, the number of pixels for $D_p$ for the one side is calculated such that 1.4 mm divided by 0.43 mm nearly equals 3. Thus, a 7×7 matrix (N=7, M=7) is used in the present embodiment.

Then, algorithm to determine a value of a given picture element $(x_n, y_N)$ is as follows. First, a maximum value is found in the matrix. That is, maximum values are found in 7 pixels from $X_{n-3}$ to $x_{n+3}$ and in 7 pixels from $y_{n-3}$ to $y_{n+3}$. The values are stored in 7×7 matrix format, and an average value of those values is taken as a final value.

As such the smoothing process is carried out, which can restrain a double image due to parallax that causes a dark part in the black and white panel to come up on a bright part.

In the present embodiment, the smoothing process is carried out by the aforementioned method. However, the present invention is not limited to the method, and a smoothing process that is generally carried out in image processing is applicable to the present invention. In order to avoid that a circuit becomes complex, it is preferable that the smoothing process be carried out according to the average computing process.

Next will be described first and second gradation converting processes carried out before and after the smoothing process.

In a first gradation converting process carried out in the first gradation converting process circuit 701, assume $X_1$ is the video source signal and $G_1(X_1)$ is a function of the video source signal $X_1$ that has been subjected to the first gradation converting process. $G_1(X_1)$ is determined so as to satisfy $O(X_1)=G_2(G_1(X_1))$.

More particularly, in the present embodiment, the second gradation converting process circuit 703 is a circuit in which the video source signal is processed in accordance with $G_2(X_3)=A \cdot B^{X_3}$, as described later. Further, a function $O(X)$ of the relationship between intended gradation of an image to be ultimately outputted from the liquid crystal panel and relative transmittance exhibits the aforementioned curve representing the relationship between gradation and relative transmittance in the black and white panel. In view of this, $G_1(X_1)$ is determined so as to satisfy $O(X_1)=G_2(G_1(X_1))$.

The first gradation converting process circuit 701 is a one-on-one gradation converting process circuit using a lookup table (LUT). That is, values of $G_1(X_1)$ that satisfy $O(X_1)=G_2(G_1(X_1))$ are stored in the LUT. The first gradation converting process is carried out by referring to the LUT. FIG. 22 shows an example of the LUT of gradation $X_1$ vs. gradation $X_2$ (a video source signal outputted from the first gradation converting process circuit 701).

Figure 23:
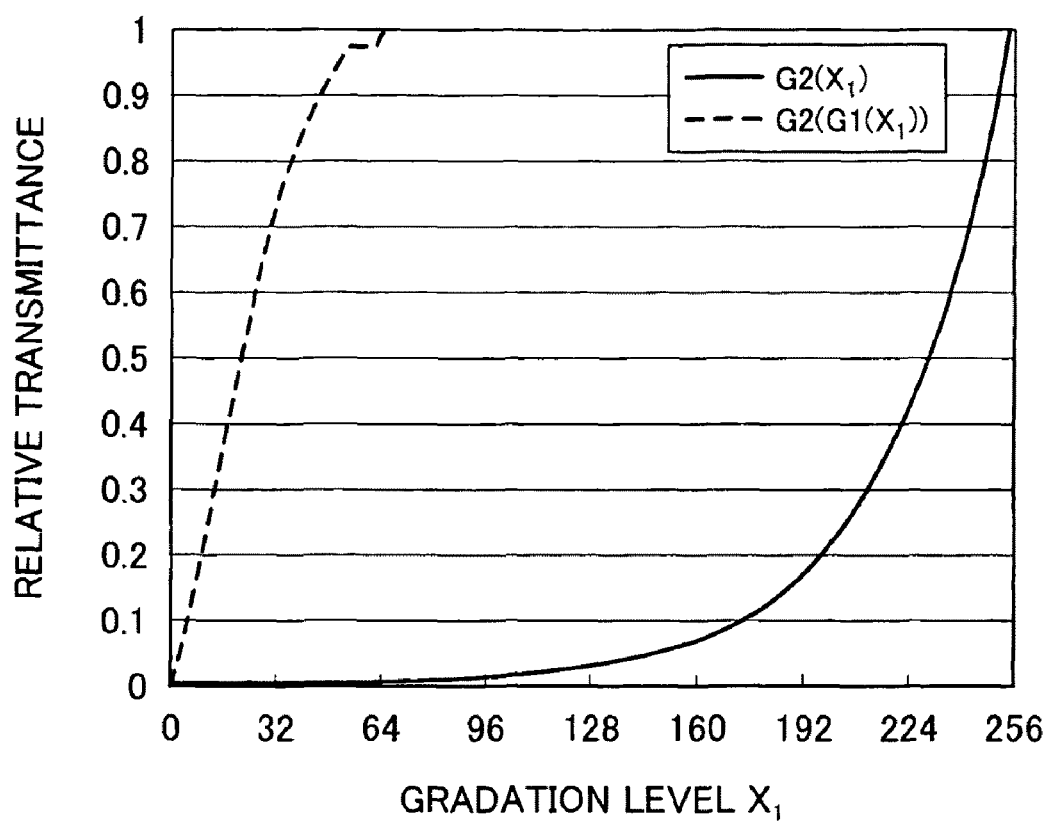
FIG. 23 is graphs representing functions $G_2(X_1)$ and $G_2(G_1(X_1))$ of a gradation converting process carried out in a second gradation converting process circuit illustrated in FIG. 21.

In a second gradation converting process carried out in the second gradation converting process circuit 703, assume $X_3$ is the video source signal that has been subjected to the smoothing process, and $G_2(X_3)$ is a function of luminance of the video source signal that has been subjected to the second gradation converting process. In the present embodiment, the second gradation converting process circuit 703 is a circuit in which the video source signal is processed in accordance with an exponential function $G_2(X_3)=A \cdot B^{X_3}$. Values A and B are determined based on contrast of a panel. In a case of a panel having contrast of 1500, A is 1500 and B is 1.029. FIG. 23 is graphs showing gradation vs. relative transmittance in $G_2(X_1)$ and $G_2(G_1(X_1))$.

In such an arrangement, an amount of changes in the relative transmittance in a part that is subjected to the smoothing process in the smoothing process circuit 702 is determined by $G_2(X_3)$, that is, the relative transmittance changes in accordance with an exponential function. In other words, the relative transmittance linearly changes on a log scale. For example, when the smoothing process is carried out such that gradation from 0 to 255 is divided into quarters, gradation levels dividing the gradation into four parts are 0, 64, 128, 192, and 255. Relative transmittances for the respective gradation levels are 7.55 e−4, 4.59 e−3, 2.79 e−2, 1.69 e−1, and 1.

According to the Weber-Fechner's law regarding an input-output relationship in reception (sensation), sensation E is expressed by the following equation: $E=K \cdot \log(I/I_o)$ (E: sensation, I: stimulus, K: proportional constant, threshold: Io) (Reference Literature 1: "Kankaku-juyo (Reception; Sensation)", online retrieval, search date: Sep. 15, 2006, URL<http://www.tmd.ac.jp/med/phy1/ptext/receptor.html>; Reference Literature 2: "Kankaku no Sokutei (Measurement of Sensation)", online retrieval, search date: Sep. 15, 2006, URL<http://www.oak.dti.ne.jp/~xkana/psycho/intro/intro_03/>). According to this, linear changes in the relative transmittance (=luminance change) on a log scale appear evenly gradated for human visual perception. On this account, the present embodiment in which the linear changes in the relative transmittance on a log scale can be obtained attains a successful smoothing result.

In the present invention, the second gradation converting process carried out in the second gradation converting step is not limited to the one carried out in accordance with the exponential function $G_2(X_3)=A \cdot B^{X_3}$. The function of $G_2(X_3)$ is preferably functions such as a power function in which a gradient increases as a gradation level of the inputted video source signal becomes larger. However, in a display in which a gradation level does not completely become zero (i.e., black is not completely expressed), it is difficult to express a gradation level close to zero. In such a case, it is preferable that the second gradation converting process be carried out in accordance with an exponential function such as $G_2(X_3)=A \cdot B^{X_3}$ in a low gradation region in which a gradation level is not greater than 16, and be carried out in accordance with an exponential function such as $K \times X_3^3$ [K: constant] in a high gradation region in which a gradation level is greater than 16.

The present embodiment deals with a liquid crystal display device constituted by two liquid crystal panels that are stacked each other, as an example. However, the liquid crystal display device of the present invention is not limited to the arrangement. The liquid crystal display device of the present invention may be constituted by a single liquid crystal panel, or by three or more liquid crystal panels that are stacked with each other. The following will describe an example of a liquid crystal display device constituted by a single liquid crystal panel.

Embodiment 2

The present embodiment deals with a liquid crystal display device constituted by a single liquid crystal panel, to which device the present invention is applied. FIG. 8 illustrates an example of the liquid crystal display device of the present embodiment.

In a case where a video image having a resolution of 960×540 is to be displayed on a display having a resolution of 1920×1080, a smoothing process can be carried out such that the resolution of the video image is simply converted into 1920×1080 (2×2 times), but dots appear rough. The video image becomes smooth by averaging 3×3 pixels for each of R, G, and B. However, this still does not solve the aforementioned problems. In this case, if the present invention is applied, it is possible to carry out the smoothing process so that the video image appears smoother for human eyes.

Figure 24:
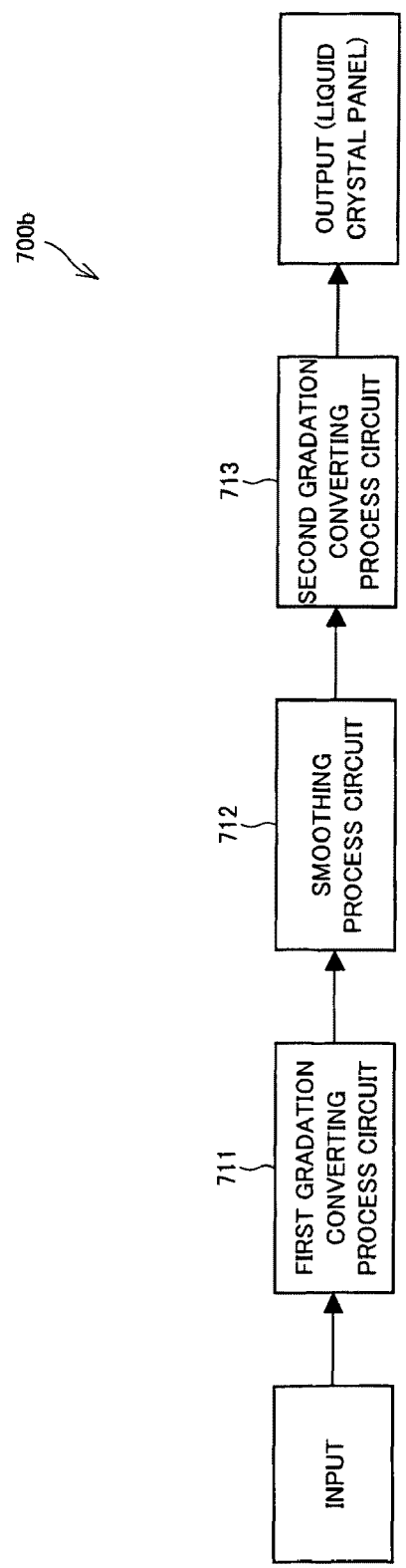
FIG. 24 is a block diagram illustrating an exemplary configuration of a driving circuit of a liquid crystal display device according to another embodiment of the present invention.

FIG. 24 illustrates a configuration of a panel drive circuit 700b provided in the liquid crystal display device of the present embodiment. As illustrated in FIG. 24, the panel drive circuit 700b includes a smoothing process circuit 712 that carries out a smoothing process with respect to an inputted video source signal. The panel drive circuit 700b further includes: (a) a first gradation converting process circuit 711 that carries out a first gradation converting process with respect to a first gradation level of the inputted video source signal that has not been subjected to the smoothing process; and (b) a second gradation converting process circuit 713 that carries out a second gradation converting process with respect to a second gradation level of the inputted video source signal that has been subjected to the smoothing process. In other words, a video source signal supplied to the panel drive circuit 700b is transmitted to the first gradation converting process circuit 711, the smoothing process circuit 712, and the second gradation converting process circuit 713 sequentially in this order. The signal thus transmitted is ultimately sent to a liquid crystal panel as image data.

As such, the first gradation converting process circuit, the smoothing process circuit 712, and the second gradation converting process circuit are provided, in this order, between (i) an input section that supplies the video source signal to the panel drive circuit 700b and (ii) the liquid crystal panel to which the inputted video source signal is ultimately sent. In the present embodiment, the second gradation converting process circuit 713 is formed in a combination of a digital-γ correction circuit and a digital/analogue conversion circuit, which set a voltage to be applied to the liquid crystal, in a liquid crystal controller. Further, in the present embodiment, the first gradation converting process circuit 711 and the smoothing process circuit 712 are formed in an FPGA (ASIC) that is followed by the liquid crystal controller. However, all of these circuits may be formed in the liquid crystal display controller.

In the present embodiment, an 8-bit signal is employed for explanation of gradation of an input signal. The signal size may be larger or smaller than this.

An inputted video source signal is referred to as $X_1$. The input signal $X_1$ is generally supplied as a single digital signal that is a separated R, G, or B signal, in a case of a digital display device such as an LCD. The input signal is supplied to the first gradation converting process circuit 711 in which the input signal is processed in accordance with a function expressed by $X_2 = G_1(X_1)$, and then supplied to the smoothing process circuit 712 in which the input signal is subjected to a smoothing process. A function used in the smoothing process is expressed by $X_3 = S(X_2)$. The $S(X)$ is a function based on image information. In connection with the first gradation converting process described in the present invention, simply assume a case where $X_3$ equals $X_2$. Then, the video source signal is sent to the second gradation converting process circuit 713 in which the signal is processed in accordance with $T = G_2(X_3)$. Thus processed signal is then outputted from the liquid crystal panel as a video signal (image data). The video source signal is converted into variation of the transmittance of the liquid crystal panel via a D/A converting process. From this reason, T is represented by a relative transmittance (maximum value: 1).

Further, a relationship between $G_1(X)$ and $G_2(X)$ satisfies $O(X_1) = G_2(G_1(X_1))$, where $X_1$ is the input signal and $O(X_1)$ is a function of a relationship between intended gradation of an image to be ultimately outputted from the liquid crystal panel and relative transmittance (luminance).

The following more particularly deals with the signal processing method in the panel drive circuit 700b. A part to which the same method as Embodiment 1 is applied is not described here, and different parts in the method will be described.

Figure 26:
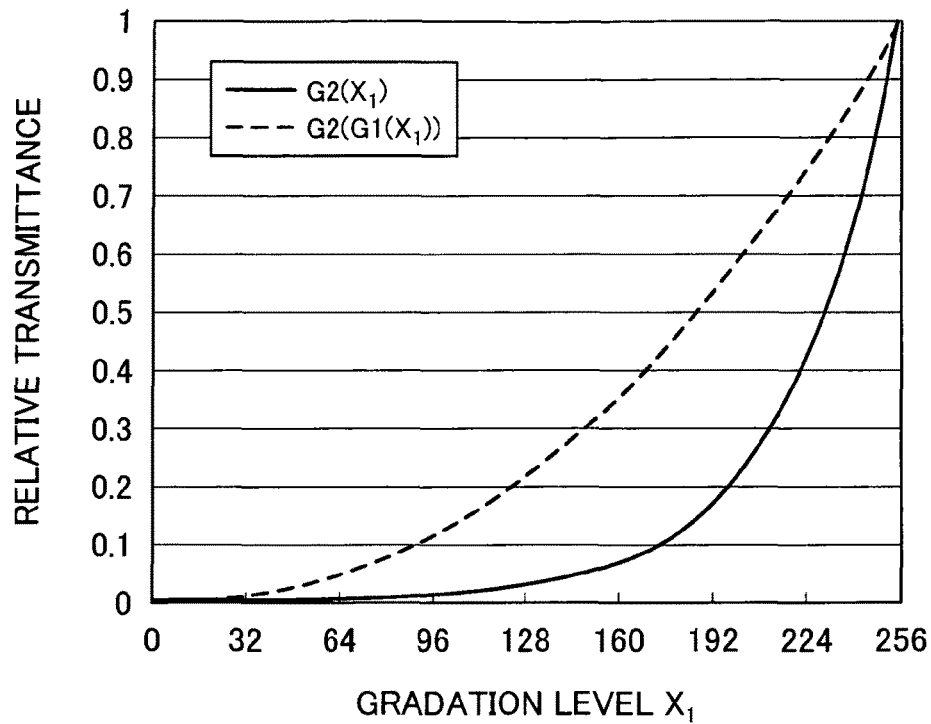
FIG. 26 is graphs representing functions $G_2(X_1)$ and $G_2(G_1(X_1))$ of a gradation converting process carried out in a second gradation converting process circuit illustrated in FIG. 25.

In the present embodiment, the second gradation converting process circuit 713 is a circuit in which the video source signal is processed in accordance with an exponential function $G_2(X_3) = A \cdot B^{X_3}$. Values A and B are determined based on contrast of a panel. In a case of a panel having a contrast of 1500, A is 1500 and B is 1.029. FIG. 26 is graphs representing gradation vs. relative transmittance in $G_2(X_1)$ and $G_2(G_1(X_1))$.

The function $O(X)$ of the relationship between intended gradation of an image to be ultimately outputted from the liquid crystal panel and relative transmittance is $X^{2.2}$ in a general display. A video image transmitted from a broadcasting station and the like has a γ characteristic of $X^{0.45}$, and therefore $O(X)$ is $(X^{0.45})^{2.2} = X$. As such, the video image is linearly reproduced.

Accordingly, when the function $O(X_1)$ is $O(X_1) = C \cdot X_1^{2.2}$ (C is a proportional constant), $G_1(X_1)$ satisfies $G_1(X_1) = 2.2 \cdot \log B(C/A \cdot X_1)$. Values obtained by the first gradation converting process in accordance with $G_1(X_1) = 2.2 \cdot \log B(C/A \cdot X_1)$ are shown in an LUT of FIG. 25.

More specifically, the first gradation converting process circuit 711 is constituted by a one-on-one gradation converting process circuit using a look up table (LUT). That is, values of $G_1(X_1)$ that satisfy $O(X_1) = G_2(G_1(X_1))$ are stored in the LUT. The first gradation converting process is carried out by referring to the LUT. FIG. 25 shows an example of the LUT of gradation $X_1$ vs. gradation $X_2$ (a video source signal outputted from the first gradation converting process circuit 711). Further, FIG. 26 is graphs representing gradation $X_1$ vs. relative transmittance in $G_2(X_1)$ and $G_2(G_1(X_1))$.

In such an arrangement, an amount of changes in the relative transmittance in a part that is subjected to the smoothing process in the smoothing process circuit 712 is determined by $G_2(X_3)$, that is, the relative transmittance changes in accordance with an exponential function. In other words, the relative transmittance linearly changes on a log scale. For example, when the smoothing process is carried out such that gradation from 0 to 255 is divided into quarters, gradation levels dividing the gradation into four parts are 0, 64, 128, 192, and 255. Relative transmittances for the respective gradation levels are 7.55 e−4, 4.59 e−3, 2.79 e−2, 1.69 e−1, and 1.

According to the Weber-Fechner's law regarding an input-output relationship in reception (sensation), sensation E is expressed by the following formula: $E = K \cdot \log(I/Io)$ (E: sensation, I: stimulus, K: proportional constant, threshold: Io). According to this, linear changes in the relative transmittance (=luminance change) on a log scale appear evenly gradated for human visual perception. On this account, the present embodiment in which the linear changes in the relative transmittance on a log scale can be obtained attains a successful smoothing result.

The above explanation deals with the cases where an input signal is expressed by, what is called, a γ function (=exponential function): $O(x) = C \cdot X^{2.2}$. However, even in a case where a signal has an other characteristic, the signal may be converted into $G_1(X)$ that satisfies $O(X_1) = G_2(G_1(X_1))$.

Embodiment 3

In the aforementioned embodiments, the function $G_2(X_3)$ of the second gradation converting process in the second gradation converting process circuit 703 (or 713) is expressed by an exponential function.

Besides the Weber-Fechner's law, in recent studies on reception (sensation), the Stevens' law has been reported (Reference Literature 3: "Shinri-butsurigaku towananika (What is psychophysics)", online retrieval, search date: Sep. 15, 2006, see "Shinri-butsuriryo to shinriryo (Psychophysical quantity and psychological quantity) URL<http://uchikawa-www.ip.titech.ac.jp/~masuda/J/principia/whatsVPP/whats-VPP.html>). It has been known that the Weber-Fechner's law is based on the Weber's law and the Weber's law is formed only within a limited range of stimulus intense. In addition, it has been found that the Fechner's law is also formed only within a limited range of stimulus intense.

According to the Stevens' law, an input-output relationship in reception (sensation) is expressed by $E = K \cdot I^3$ (E: sensation, I: stimulus, K: proportional constant). In the present embodiment, based on the Stevens' law, assume a function $G_2(X_3)$ of a second gradation converting process carried out in a second gradation converting process circuit 703 (713) is $G_2(X_3)=D \cdot X_3^3$ (D: constant). A function O(X) of a relationship between intended gradation of an image to be ultimately outputted from a liquid crystal panel and relative transmittance is $O(X_1)=C \cdot X_1^{2.2}$, similarly to Embodiment 1. Accordingly, a function $G_1(X_1)$ is expressed by $G_1(X_1)=\{C/D \cdot X_1^{2.2}\}^{0.33}$.

A concrete value of D is determined, for example, as follows.

$G_2(X_3)$ is 1 when $X_3$ is 255. Accordingly, D is $1/255^3$.

Figure 27:
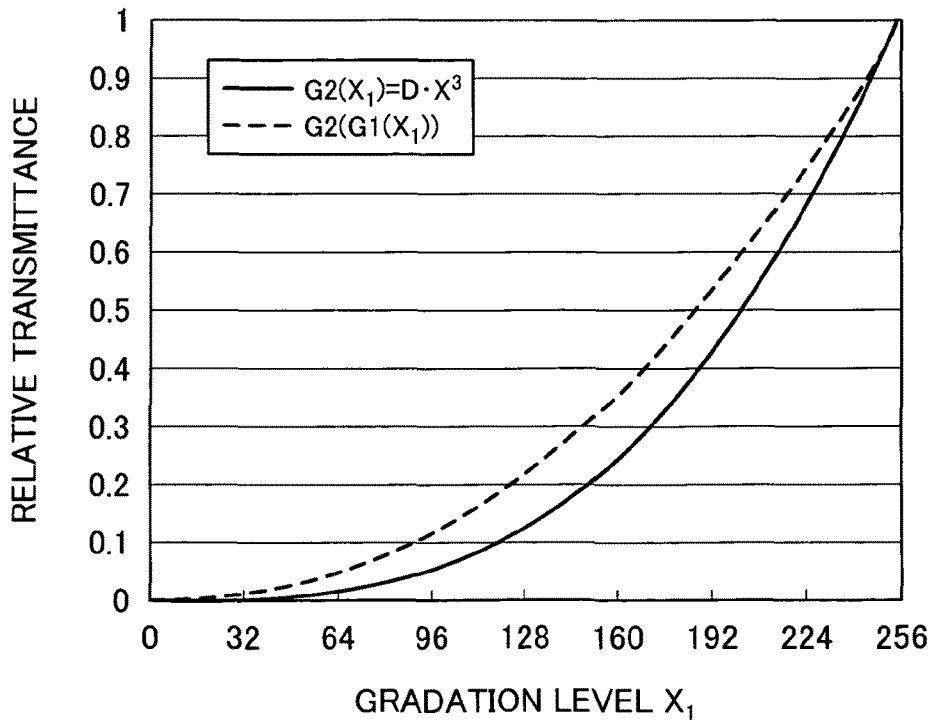
FIG. 27 is graphs representing functions $G_2(X_1)$ and $G_2(G_1(X_1))$ of a gradation converting process carried out in a second gradation converting process circuit in a driving circuit of a liquid crystal display device according to further another embodiment of the present invention.
Figure 28:
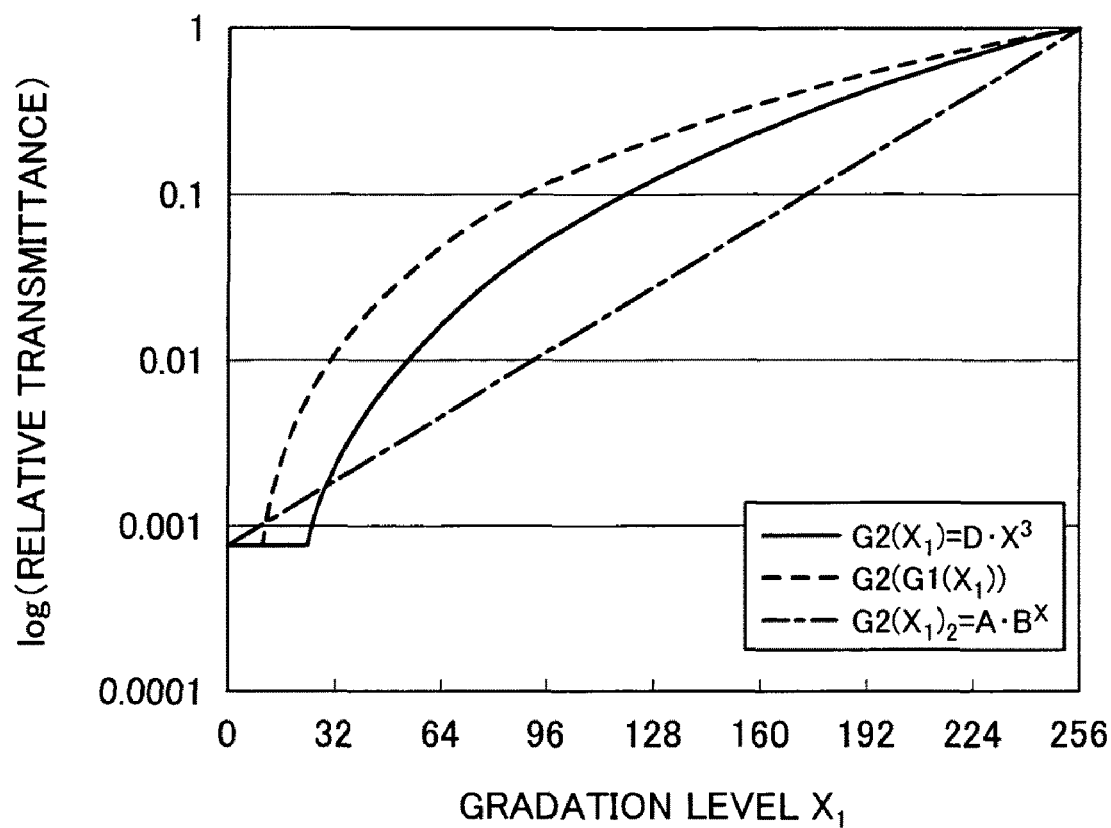
FIG. 28 is graphs in which tone-luminance (transmittance) characteristics shown in FIG. 27 are plotted on a log scale.

In this case, plots of $G_2(X_1)$ and $G_2(G_1(X_1))$ are as shown in FIG. 27. FIG. 28 is graphs in which a vertical axis in FIG. 27 is plotted on a log scale. As shown in FIG. 28, the relative transmittances are in good condition at a gradation level of not less than 24, but the relative transmittances are saturated at a gradation level of not more than 24. That the relative transmittance is saturated means that a curve of the relative transmittance decreases from a high gradation level to a low gradation level but the declination stops at a gradation level of 24. This is because the contrast of the liquid crystal panel is limited and the relative transmittance cannot be less than the value.

On the other hand, in the exponential function $A \cdot B^X$ described in Embodiment 2, when X is zero, $B^0$ is 1. In this case, if A is set an adequate value, the relative transmittance can be a finite value that is not zero, at a gradation level of 0, thereby realizing a display. On this account, in a case where a gradation level of an input signal is not more than 32, it is preferable that the function $A \cdot B^X$ (exponential function) described in Embodiment 2 be used.

In this way, the present invention may solely employ the aforementioned exponential function or the function $K \times X_3^3$ [K: constant], or a combination of the functions as the function $G_2(X_3)$. When both functions are used in combination for the second gradation converting process, the functions are optimally selected, depending on a gradation level, so that the second gradation converting process is carried out desirably. This can improve display quality of a display device.

In the present embodiment, $G_2(X_3)$ is $G_2(X_3)=D \cdot X_3^3$ and therefore $G_1(X_1)$ is $G_1(X_1)=\{C/D \cdot X_1^{2.2}\}^{0.33}$. Other arrangements except for this point can be the same as those of Embodiment 1 or 2, and are not explained here.

Embodiment 4

Figure 29:
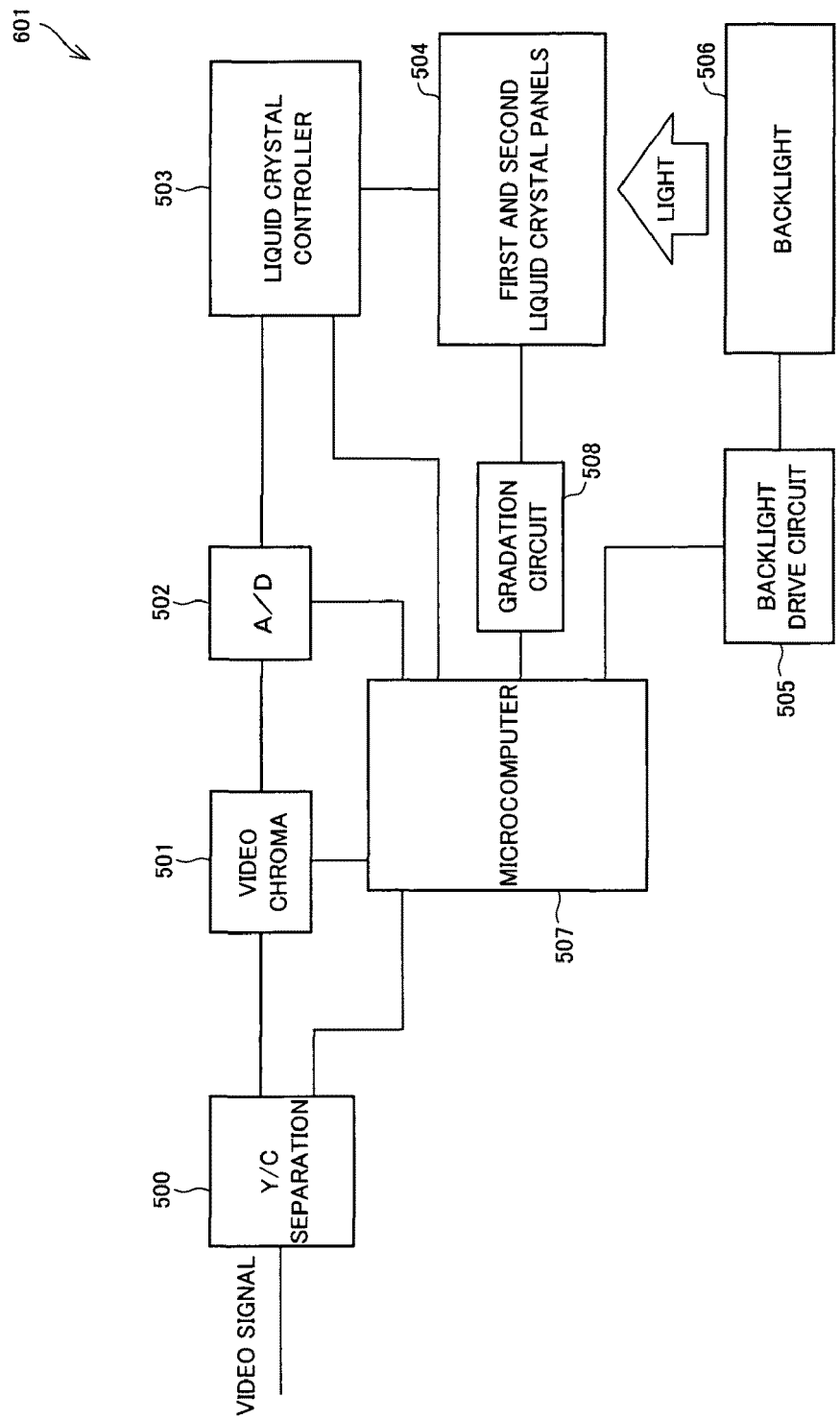
FIG. 29 is a block diagram schematically illustrating a television receiver including a liquid crystal display device of the present invention.
Figure 30:
FIG. 30 is a block diagram illustrating a relationship between a tuner section and a liquid crystal display device in the television receiver of FIG. 29.
Figure 31:
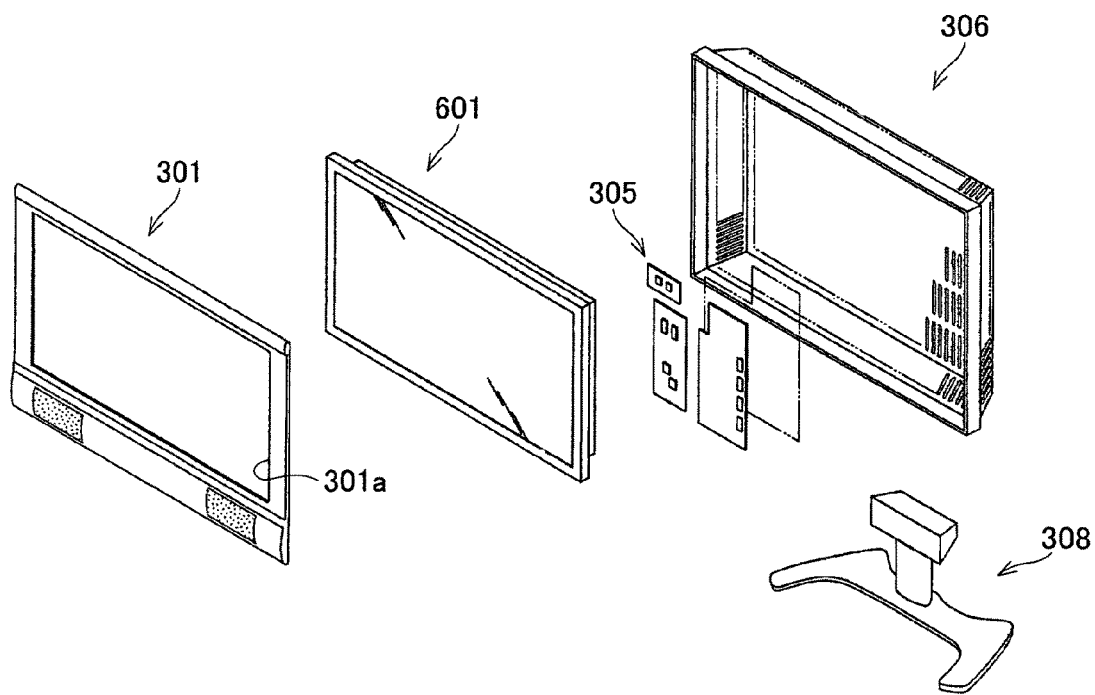
FIG. 31 is an exploded perspective view of the television receiver of FIG. 30.

Referring to FIGS. 29 through 31, the following deals with a television receiver to which the liquid crystal display device of the present invention is applied.

FIG. 29 is a block diagram of a circuit of a liquid crystal display devise 601 for a television receiver.

The liquid crystal display device 601 includes, as shown in FIG. 29, a Y/C conversion circuit 500, a video chroma circuit 501, an A/D converter 502, a liquid crystal controller 503, a liquid crystal panel 504, a backlight drive circuit 505, a backlight 506, a microcomputer 507, and a gradation circuit 508.

The liquid crystal panel 504 has a double-panel structure in which first and second liquid crystal panels are attached to each other, and may have any of the arrangements described in Embodiments.

In the liquid crystal display device as arranged above, an input video signal of a television signal is supplied to the Y/C separation circuit 500, and separated into a luminance signal and a color signal. The luminance and color signals are then supplied to the video chroma circuit 501, and respectively converted into R, G, and B (light's three primary colors) signals. The analogue RGB signals are supplied to the A/D converter 502, and converted into digital RGB signals. The digital RGB signals are then sent to the liquid crystal controller 503.

While the liquid crystal controller 503 sends the RGB signals to the liquid crystal panel 504 at predetermined timing, the gradation circuit 508 supplies gradation voltages respectively for the RGB signals to the liquid crystal panels 504. Herewith, an image is displayed. An entire system including these processes is controlled by the microcomputer 507.

The video signal may be a video signal based on television broadcasting, a video signal taken by a camera, a video signal supplied via an Internet line, or other various signals.

Further, a tuner section 600 shown in FIG. 30 receives a television broadcast and outputs a video signal. The liquid crystal display device 601 displays an image (video image) based on the video signal supplied from the tuner section 600.

Moreover, if the liquid crystal display device as arranged above is a television receiver, the liquid crystal display device 601 is, for example, sandwiched by and enclosed in a first housing 301 and a second housing 306, as illustrated in FIG. 31.

An opening 301a is formed through the first housing 301. The video image displayed on the liquid crystal display device 601 is visible through the opening 301a.

The second housing 306 covers a back of the liquid crystal display device 601. The housing 306 is provided with an operation circuit 305 for operating the liquid crystal display device 601. A support member 308 is attached to a bottom of the housing 306.

As such, applying the liquid crystal display device of the present invention to a display device of the television receiver as arranged above (i) enables to output a video image that has been subjected to a smoothing process, which video image appears smoother for human eyes, and (ii) allows the video image to be displayed with a super high display quality.

The present invention is not limited to the description of the embodiments above, but may be altered by a skilled person within the scope of the claims. An embodiment based on a proper combination of technical means disclosed in different embodiments is encompassed in the technical scope of the present invention.

Further, the embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below. The scope of the present invention is as shown in the following claims, and is not limited by the description of the specification. Further, all modifications, alterations, and processes within a scope equivalent to the scope of the following claims are covered by the present invention.

Industrial Applicability

The liquid crystal display device of the present invention has a successful smoothing characteristic, and is applicable to a television receiver that frequently displays video images having various formats. Further, since the liquid crystal display device of the present invention is capable of displaying a high display quality video image, the liquid crystal display device of the present invention is applicable to a television receiver, a monitor for broadcasting, and the like devices.

The invention claimed is:

1. A method for driving a display device that outputs an image based on a video source, said method comprising:
carrying out a first gradation converting process with respect to a first gradation level of an inputted video source signal and correcting a tone-luminance characteristic of the inputted video source signal,
carrying out a smoothing process with respect to the inputted video source signal which has been subjected to the first gradation converting process; and
carrying out a second gradation converting process with respect to a second gradation level of the inputted video source signal which has been subjected to the smoothing process, the carrying out a second gradation converting process is based on a contrast of the display device, wherein
$O(X_1)=G_2(G_1(X_1))$ is satisfied,
where $X_1$ is the inputted video source signal,
$O(X_1)$ is a function of luminance of the image to be outputted in response to the inputted video source signal $X_1$,
$G_1(X_1)$ is a function of the video source signal $X_1$ which has been subjected to the first gradation converting process,
$X_3$ is the inputted video source signal which has been subjected to the smoothing process, and
$G_2(X_3)$ is a function of luminance of the video source signal $X_3$ which has been subjected to the second gradation converting process, $G_2(X_3)=K \times X_3^3$, K is a constant.

2. A method for driving a display device that outputs an image based on a video source, said method comprising:
carrying out a first gradation converting process with respect to a first gradation level of an inputted video source signal and correcting a tone-luminance characteristic of the inputted video source signal,
carrying out a smoothing process with respect to the inputted video source signal which has been subjected to the first gradation converting process; and
carrying out a second gradation converting process with respect to a second gradation level of the inputted video source signal which has been subjected to the smoothing process, the carrying out a second gradation converting process is based on a contrast of the display device, wherein
$O(X_1)=G_2(G_1(X_1))$ is satisfied,
where $X_1$ is the outputted video source signal;
$O(X_1)$ is a function of luminance of the image to be outputted in response to the inputted video source signal $X_1$,
$G_1(X_1)$ is a function of the video source signal $X_1$ which has been subjected to the first gradation converting process,
$X_3$ is the inputted video source signal which has been subjected to the smoothing process, and
$G_2(X_3)$ is a function of luminance of the video source signal $X_3$ which has been subjected to the second gradation converting process, $G_2(X_3)$ is changed from an exponential function to $K \times X_3^3$, K is a constant, or vice versa depending on a gradation level of the video source signal $X_3$.

3. A method for driving a display device that outputs an image based on a video source, said method comprising:
carrying out a first gradation converting process with respect to a first gradation level of an inputted video source signal,
carrying out a smoothing process with respect to the inputted video source signal which has been subjected to the first gradation converting process; and
carrying out a second gradation converting process with respect to a second gradation level of the inputted video source signal which has been subjected to the smoothing process, wherein
$O(X_1)=G_2(G_1(X_1))$ is satisfied,
where $X_1$ is the inputted video source signal,
$O(X_1)$ is a function of luminance of the image to be outputted in response to the inputted video source signal $X_1$,
$G_1(X_1)$ is a function of the video source signal $X_1$ which has been subjected to the first gradation converting process,
$X_3$ is the inputted video source signal which has been subjected to the smoothing process, and
$G_2(X_3)$ is a function of luminance of the video source signal $X_3$ which has been subjected to the second gradation converting process, when $G_2(X_3)$ is an exponential function $A \cdot B^x{}_3$, A and B are constants, and $O(X_1)$ is $C \cdot X_1^{2.2}$, C is a proportional constant,
$G_1(X_1)=2.2 \cdot \log B(C/A \cdot X_1)$ is satisfied.

4. A method for driving a display device that outputs an image based on a video source, said method comprising:
carrying out a first gradation converting process with respect to a first gradation level of an inputted video source signal,
carrying out a smoothing process with respect to the inputted video source signal which has been subjected to the first gradation converting process; and
carrying out a second gradation converting process with respect to a second gradation level of the inputted video source signal which has been subjected to the smoothing process, wherein
$O(X_1)=G_2(G_1(X_1))$ is satisfied,
where $X_1$ is the inputted video source signal,
$O(X_1)$ is a function of luminance of the image to be outputted in response to the inputted video source signal $X_1$,
$G_1(X_1)$ is a function of the video source signal $X_1$ which has been subjected to the first gradation converting process,
$X_3$ is the inputted video source signal which has been subjected to the smoothing process, and
$G_2(X_3)$ is a function of luminance of the video source signal $X_3$ which has been subjected to the second gradation converting process, when $G_2(X_3)$ is $K \times X_3^3$, K is a constant, and $O(X_1)$ is $C \cdot X_1^{2.2}$, C is a proportional constant,
$G_1(X_1)=\{C/K \cdot X_1^{2.2}\}^{0.33}$ is satisfied.

5. A driving circuit, for use in a display device configured to output an image based on a video source, configured to supply image data to a display panel, said driving circuit comprising:
a first gradation converting process circuit configured to carry out a first gradation converting process with respect to a first gradation level of an inputted video source signal;
a smoothing process circuit configured to carry out a smoothing process with respect to the inputted video source signal which has been subjected to the first gradation converting process; and
a second gradation converting process circuit configured to carry out a second gradation converting process with respect to a second gradation level of the inputted video source signal which has been subjected to the smoothing process, wherein $O(X_1)=G_2(G_1(X_1))$ is satisfied,
- where $X_1$ is the inputted video source signal,
- $O(X_1)$ is a function of luminance of the image to be outputted in response to the inputted video source signal $X_1$,
- $G_1(X_1)$ is a function of the video source signal $X_1$ which has been subjected to the first gradation converting process,
- $X_3$ is the inputted video source signal which has been subjected to the smoothing process, and
- $G_2(X_3)$ is a function of luminance of the video source signal $X_3$ which has been subjected to the second gradation converting process, when $G_2(X_3)$ is an exponential function $A \cdot B^{X_3}$, A and B are constants, and $O(X_1)$ is $C \cdot X_1^{2.2}$, C is a proportional constant,
- $G_1(X_1)=2.2 \cdot \log_B(C/A \cdot X_1)$ is satisfied.

6. A driving circuit, for use in a display device configured to output an image based on a video source, configured to supply image data to a display panel, said driving circuit comprising:
- a first gradation converting process circuit configured to carry out a first gradation converting process with respect to a first gradation level of an inputted video source signal;
- a smoothing process circuit configured to carry out a smoothing process with respect to the inputted video source signal which has been subjected to the first gradation converting process; and
- a second gradation converting process circuit configured to carry out a second gradation converting process with respect to a second gradation level of the inputted video source signal which has been subjected to the smoothing process, wherein $O(X_1)=G_2(G_1(X_1))$ is satisfied,
- where $X_1$ is the inputted video source signal,
- $O(X_1)$ is a function of luminance of the image to be outputted in response to the inputted video source signal $X_1$,
- $G_1(X_1)$ is a function of the video source signal $X_1$ which has been subjected to the first gradation converting process,
- $X_3$ is the inputted video source signal which has been subjected to the smoothing process, and
- $G_2(X_3)$ is a function of luminance of the video source signal $X_3$ which has been subjected to the second gradation converting process, when $G_2(X_3)$ is $K \times X_3^3$, K is a constant, and $O(X_1)$ is $C \cdot X_1^{2.2}$, C is a proportional constant,
- $G_1(X_1)=\{C/K \cdot X_1^{2.2}\}^{0.33}$ is satisfied.

* * * * *